(12) United States Patent
Wason

(10) Patent No.: US 11,426,806 B2
(45) Date of Patent: Aug. 30, 2022

(54) PORTABLE IN-LINE CUTTING TOOL WITH STABILIZER

(71) Applicant: Hubbell Incorporated, Shelton, CT (US)

(72) Inventor: Peter Matthew Wason, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/378,992

(22) Filed: Apr. 9, 2019

(65) Prior Publication Data

US 2019/0308255 A1 Oct. 10, 2019

Related U.S. Application Data

(60) Provisional application No. 62/655,460, filed on Apr. 10, 2018.

(51) Int. Cl.

| B23D 15/14 | (2006.01) |
|---|---|
| B26D 5/12 | (2006.01) |
| B25B 28/00 | (2006.01) |
| B25F 5/00 | (2006.01) |
| B26B 15/00 | (2006.01) |
| B23D 29/02 | (2006.01) |
| B25F 5/02 | (2006.01) |

(52) U.S. Cl.
CPC ............ *B23D 15/14* (2013.01); *B23D 29/023* (2013.01); *B25B 28/00* (2013.01); *B25F 5/005* (2013.01); *B25F 5/02* (2013.01); *B26B 15/00* (2013.01); *B26D 5/12* (2013.01)

(58) Field of Classification Search
CPC ...... B23D 15/14; B23D 17/06; B23D 29/002; B23D 29/023; B23D 33/02; B23D 35/001; B25B 28/00; B25F 5/005; B25F 5/02; B26B 15/00; B26D 5/12
See application file for complete search history.

(56) References Cited

U.S. PATENT DOCUMENTS

| 4,103,419 A | 8/1978 | Matthews |
| 5,044,569 A | 9/1991 | LaBounty et al. |
| (Continued) | | |

OTHER PUBLICATIONS

International Search Report and Written Opinion mailed in PCT/US2019/026493 dated Jul. 5, 2019.
(Continued)

*Primary Examiner* — Stephen Choi
(74) *Attorney, Agent, or Firm* — Wissing Miller LLP

(57) ABSTRACT

An in-line portable, hand held hydraulic cutting tool having a handle assembly and a working head assembly is provided. The handle assembly has a tool frame portion and a neck portion. The working head assembly has a pair of jaw members joined so that they are movable relative to each other and held in place by a locking pin. Each jaw member has a cutting blade secured to or directly formed into the jaw member. A stabilizer can be secured to or directly formed into one or both jaw members. The one or more stabilizers are aligned with a respective cutting blade such that during a cutting operation at least an edge of the stabilizer engages an object being cut to limit rotation of the object during the cutting operation.

17 Claims, 25 Drawing Sheets

(56) References Cited

U.S. PATENT DOCUMENTS

| | | | |
|---|---|---|---|
| 5,235,750 A * | 8/1993 | Brown | B23D 29/023 |
| | | | 30/134 |
| 5,289,712 A | 3/1994 | Haughian | |
| 7,216,523 B2 | 5/2007 | Frenken | |
| 7,219,526 B2 | 5/2007 | Herod | |
| 7,290,431 B1 | 11/2007 | Spivak | |
| 7,409,846 B2 | 8/2008 | Frenken | |
| 7,434,441 B2 | 8/2008 | Frenken | |
| 7,464,578 B2 | 12/2008 | Ayer | |
| 7,665,343 B2 | 2/2010 | Ballas et al. | |
| D657,220 S | 4/2012 | Isobe | |
| D657,221 S | 4/2012 | Isobe | |
| 8,336,362 B2 | 12/2012 | Frenken | |
| D673,829 S | 1/2013 | Takeshima | |
| D696,090 S | 12/2013 | Taeksehima | |
| D709,748 S | 7/2014 | Frenken | |
| D710,173 S | 8/2014 | Frenken | |
| 8,813,370 B2 | 8/2014 | Pellenc | |
| D729,602 S | 5/2015 | Stucki | |
| D734,112 S | 7/2015 | Herault | |
| D767,959 S | 10/2016 | Sokat | |
| D767,960 S | 10/2016 | Haneishi | |
| 9,484,700 B2 | 11/2016 | Kehoe | |
| D774,858 S | 12/2016 | Stucki | |
| D779,902 S | 2/2017 | Sokat | |
| 10,008,427 B2 | 9/2018 | Wason et al. | |
| D832,670 S | 11/2018 | Uchiyama | |
| D834,908 S | 12/2018 | Konnecke | |
| D835,487 S | 12/2018 | Wason | |
| 2002/0007658 A1 | 1/2002 | Amherd | |
| 2004/0144146 A1 | 7/2004 | Amherd | |
| 2005/0262697 A1 | 12/2005 | Stein | |
| 2006/0000072 A1 | 1/2006 | Frenken | |
| 2006/0005395 A1 | 1/2006 | Sederberg | |
| 2006/0272381 A1 | 12/2006 | Ayer | |
| 2007/0033812 A1 | 2/2007 | Kimura | |
| 2007/0256554 A1 | 11/2007 | Montminy | |
| 2008/0072436 A1 | 3/2008 | Frenken | |
| 2008/0087064 A1 | 4/2008 | Lefavour | |
| 2009/0031779 A1 * | 2/2009 | Lefavour | B21D 39/04 |
| | | | 72/416 |
| 2010/0107843 A1 | 5/2010 | Lefavour | |
| 2010/0325894 A1 | 12/2010 | Scott | |
| 2014/0020528 A1 * | 1/2014 | Wason | B25B 7/02 |
| | | | 83/13 |
| 2014/0182441 A1 * | 7/2014 | Pisczak | B23D 35/001 |
| | | | 83/694 |
| 2014/0360024 A1 | 12/2014 | Schneider | |
| 2015/0089816 A1 | 4/2015 | Chiasson | |
| 2015/0283693 A1 | 10/2015 | Chiasson et al. | |
| 2016/0039017 A1 | 2/2016 | Lawlor et al. | |
| 2016/0059328 A1 | 3/2016 | Jacobson | |
| 2016/0252112 A1 | 9/2016 | Kehoe | |
| 2017/0317461 A1 | 11/2017 | Wason | |
| 2017/0334003 A1 | 11/2017 | Lawlor | |
| 2018/0272445 A1 | 9/2018 | Perkins | |
| 2018/0326600 A1 * | 11/2018 | Wason | B23D 29/002 |
| 2020/0006907 A1 | 1/2020 | Torrey et al. | |
| 2020/0021088 A1 | 1/2020 | Ballard et al. | |

OTHER PUBLICATIONS

International Preliminary Report on Patentability mailed in corresponding International Application PCT/US2019/026493 dated Oct. 22, 2020.

MA6568 Next Generation Gator Tools Brochure, 2016 Greenlee Textron Inc, www.greenlee.com, pp. 1-39, Sep. 2016.

EP Communication pursuant to Rule 164(1) EPC dated Dec. 6, 2021 (15 pages).

* cited by examiner

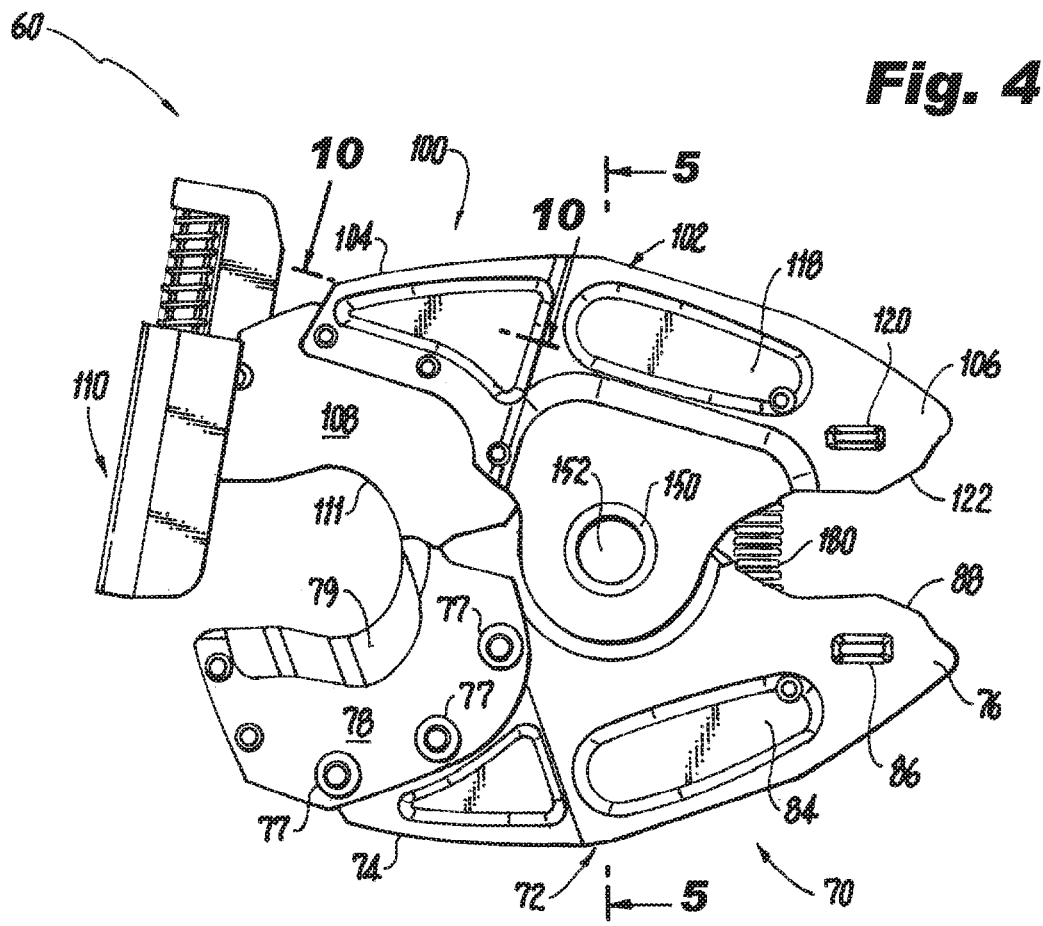
Fig. 4
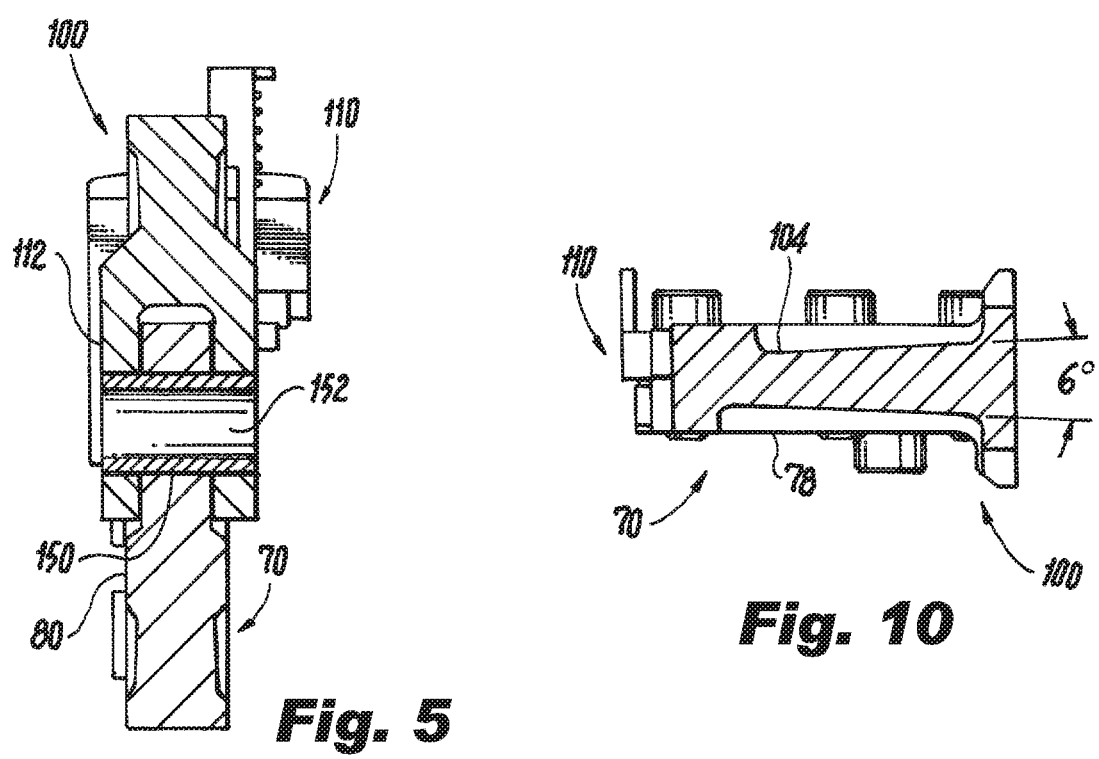
Fig. 5
Fig. 10

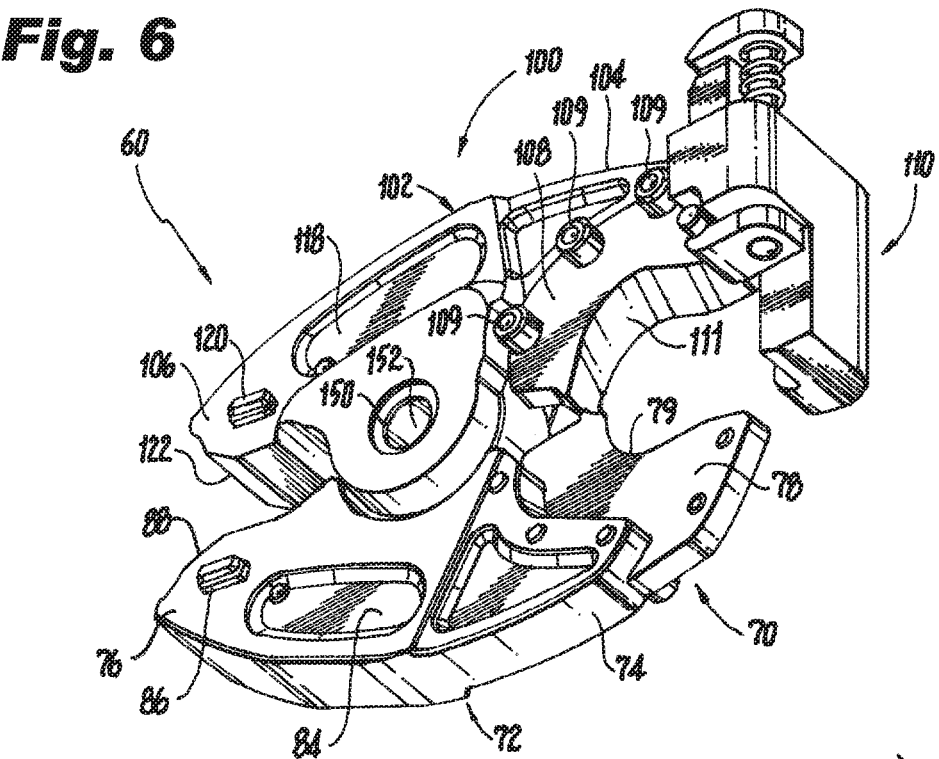

PORTABLE IN-LINE CUTTING TOOL WITH STABILIZER

CROSS REFERENCE TO RELATED APPLICATIONS

The present disclosure is based on and claims benefit from U.S. Provisional Patent Application Ser. No. 62/655,460 filed on Apr. 10, 2018 entitled "Portable In-Line Cutting Tool with Stabilizer" the contents of which are incorporated herein in their entirety by reference.

BACKGROUND

Field

The present disclosure relates to cooperating jaws and hydraulic tools having cooperating jaws. More particularly, the present disclosure relates to hydraulic, hand-held cutting tools and jaw heads for such cutting tools that include conductor, cable or wire stabilizers that limit rotation of a conductor, cable or wire during a cutting operation or the cutting action.

Description of the Related Art

Hand-held hydraulic tools are well known in the art. These tools use cooperating jaws that are hydraulically pressed together with great force to cut materials such as electrical conductors. These tools may be battery-powered to allow mobility and portability for the user. These tools typically employ a locking pin that holds the jaws together for the cutting operation. The locking pin is removed to release the jaws. When cutting large diameter (or gauge) conductors, cables or wires or cutting conductors, cables or wires with a steel core, the conductor, cable or wire may rotate during a cutting operation, which may decrease the efficiency of the cut and/or the life cycle of the cutting edges of the cutting blades of the cutting tool.

SUMMARY

The present disclosure provides exemplary embodiments of portable, hand held hydraulic cutting tools. For example, the cutting tool may be an in-line portable, hand held hydraulic cutting tool having an in-line handle assembly and a working head assembly. The handle assembly has a tool frame portion and a neck portion. The working head assembly has a pair of jaw members joined so that they are movable relative to each other and held in place by a locking pin. Each jaw member has a cutting blade secured to or directly formed into the jaw member. A stabilizer can be secured to or directly formed into one or both jaw members. The one or more stabilizers are aligned with a respective cutting blade such that during a cutting operation at least an edge of the stabilizer engages an object being cut to limit rotation of the object during the cutting operation.

In one exemplary embodiment, the present disclosure includes a working head assembly for an in-line hydraulic cutting tool. The working head assembly includes a first jaw member, a second jaw member, at least one stabilizer, a spring member and a locking pin. The first jaw member has a proximal end portion and a distal end portion. The distal end portion includes a first cutting blade, and the proximal end portion includes a first pivot point member having a first aperture therethrough. The proximal end portion is adapted to be operatively coupled to a neck of the cutting tool. The second jaw member has a proximal end portion and a distal end portion. The distal end portion includes a second cutting blade, and the proximal end portion includes a second pivot point member having a second aperture therethrough. The first pivot point member may be for example a tang having the first aperture, and the second pivot point member may be for example a clevis having the second aperture, where the clevis receives the tang so that the first aperture can align with the second aperture. The proximal end portion is adapted to be operatively coupled to a neck of the cutting tool. The at least one stabilizer is coupled to or formed into the distal end of the first jaw member or the second jaw member and positioned in alignment with the first or second cutting blade such that during a cutting operation of the cutting tool at least an edge of the at least one stabilizer engages an object being cut to limit rotation of the object being cut. The spring member has a first end attached to the proximal end portion of the first jaw member and a second end attached to the proximal end portion of the second jaw member. The locking pin passes through the first and second apertures when the first and second apertures are aligned to operatively couple the first jaw member to the second jaw member. The first pivot point member, the second pivot point member and the pin form a pivot point about which the first and second jaw members can rotate.

In another exemplary embodiment, the working head assembly includes a first jaw member, a second jaw member, a first stabilizer, a second stabilizer, a spring member and a locking pin. The first jaw member has a proximal end portion and a distal end portion. The distal end portion includes a first cutting blade. The proximal end portion includes a first pivot point member having a first aperture therethrough. The proximal end portion is adapted to be operatively coupled to a neck of the cutting tool. The second jaw member has a proximal end portion and a distal end portion. The distal end portion includes a second cutting blade. The proximal end portion includes a second pivot point member having a second aperture therethrough. The proximal end portion is adapted to be operatively coupled to a neck of the cutting tool. The first stabilizer is coupled to the first jaw member. The first stabilizer is aligned with the second cutting blade such that during a cutting operation of the cutting tool at least an edge of the first stabilizer engages an object being cut to limit rotation of the object being cut. The second stabilizer is coupled to the second jaw member. The second stabilizer is aligned with the first cutting blade such that during a cutting operation of the cutting tool at least an edge of the second stabilizer engages an object being cut to limit rotation of the object being cut. The spring member has a first end attached to the proximal end portion of the first jaw member and a second end attached to the proximal end portion of the second jaw member. The locking pin can pass through the first and second apertures when the first and second apertures are aligned to operatively couple the first jaw member to the second jaw member and form a pivot point about which the first and second jaw members can rotate.

In the embodiments described above, the first stabilizer can be coupled to the first jaw member by releasably securing the first stabilizer to the first jaw member, or by directly forming the first stabilizer into the first jaw member. Further, the stabilizers described herein can be positioned in alignment with the respective cutting blade so that the edge or surface of the stabilizer engages the object after rotation the object exceeds a threshold angle, where the threshold angle may be in the range of about 15 degrees and about 25 degrees.

The present disclosure also provides exemplary embodiments of working head assemblies for in-line hydraulic cutting tools that include improved cutting blades. In one exemplary embodiment, a working head assembly includes a first jaw member, a second jaw member, a spring member and a locking pin. The first jaw member has a proximal end portion and a distal end portion. The distal end portion includes a first cutting blade having a cutting edge with a thickness in the range from about 0.03 inches to about 0.05 inches. The proximal end portion includes a first pivot point member having a first aperture therethrough. The proximal end portion is adapted to be operatively coupled to a neck of the cutting tool, the proximal end portion. The second jaw member has a proximal end portion and a distal end portion. The distal end portion includes a second cutting blade having a cutting edge with a thickness in the range from about 0.03 inches to about 0.05 inches. The proximal end portion includes a second pivot point member having a second aperture therethrough. The proximal end portion is adapted to be operatively coupled to a neck of the cutting tool. The spring member has a first end attached to the proximal end portion of the first jaw member and a second end attached to the proximal end portion of the second jaw member. The locking pin can pass through the first and second apertures when the first and second apertures are aligned to operatively couple the first jaw member to the second jaw member. The first pivot point member, the second pivot point member and the pin form a pivot point about which the first and second jaw members can rotate.

The various advantages aspects and features of the various embodiments of the present disclosure and claimed herein should become evident to a person of ordinary skill in the art given the following enabling description and drawings. The aspects and features disclosed herein are believed to be novel and other elements characteristic of the various embodiments of the invention are set forth with particularity in the appended claims. The drawings are for illustration purposes only and are not drawn to scale unless otherwise indicated. The drawings are not intended to limit the scope of the invention despite depicting a presently preferred embodiment of the invention. The following enabling disclosure is directed to one of ordinary skill in the art and presupposes that those aspects of the invention within the ability of the ordinarily skilled artisan are understood and appreciated.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 4 is a side elevation view of the working head assembly of FIG. 3;

FIG. 5 is a cross-sectional view of the working head assembly of FIG. 3 taken along line 5-5;

FIG. 6 is a top side perspective view of a second side of the working head assembly of FIG. 4;

FIG. 7 is a top side perspective view of the second side of the working head assembly of FIG. 6 with the jaw members separated;

FIG. 10 is a partial cross-sectional view of a portion of the working head assembly of FIG. 4 taken from line 10-10;

DETAILED DESCRIPTION

The present disclosure will be shown and described in connection with portable, battery-powered, in-line, hand-held hydraulic cutting tools. However, the portable, battery-powered, hand-held hydraulic cutting tool may be a pistol grip or other type grip portable, battery-powered, hand-held hydraulic cutting tool. For ease of description, the portable, battery-powered, hydraulic cutting tools according to the present disclosure may also be referred to as the "tools" in the plural and the "tool" in the singular. The conductors, cables, wires or other objects to be cut by the tool of the present disclosure may also be referred to as the "conductors" in the plural and the "conductor" in the singular. In addition, as used in the present disclosure, the terms "front," "rear," "upper," "lower," "upwardly," "downwardly," and other orientation descriptors are intended to facilitate the description of the exemplary embodiments disclosed herein and are not intended to limit the structure of the exemplary embodiments or limit the claims to any particular position or orientation.

Figure 1:
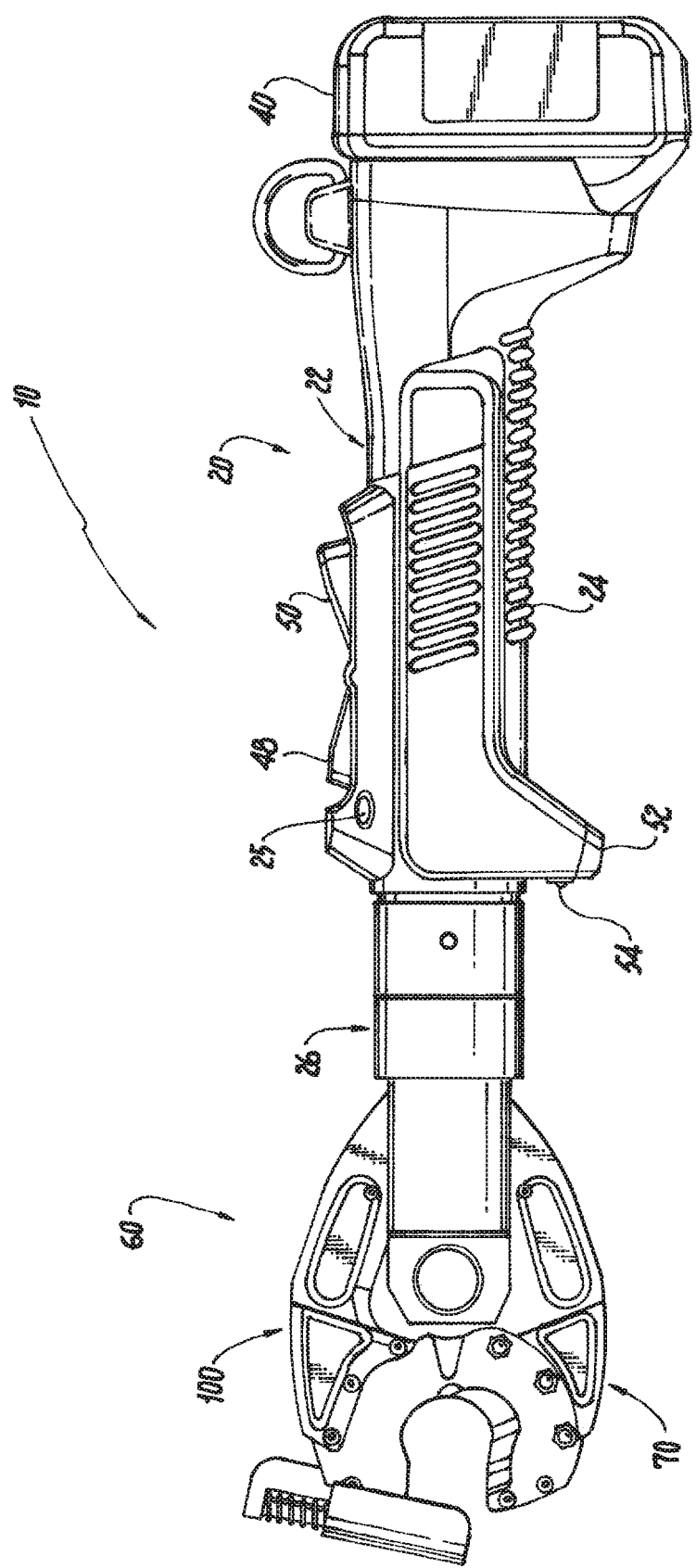
FIG. 1 is a side elevation view of a first side of an exemplary embodiment of a battery-powered tool according to the present disclosure, illustrating a working head assembly having cutting jaws and an in-line type handle assembly.
Figure 2:
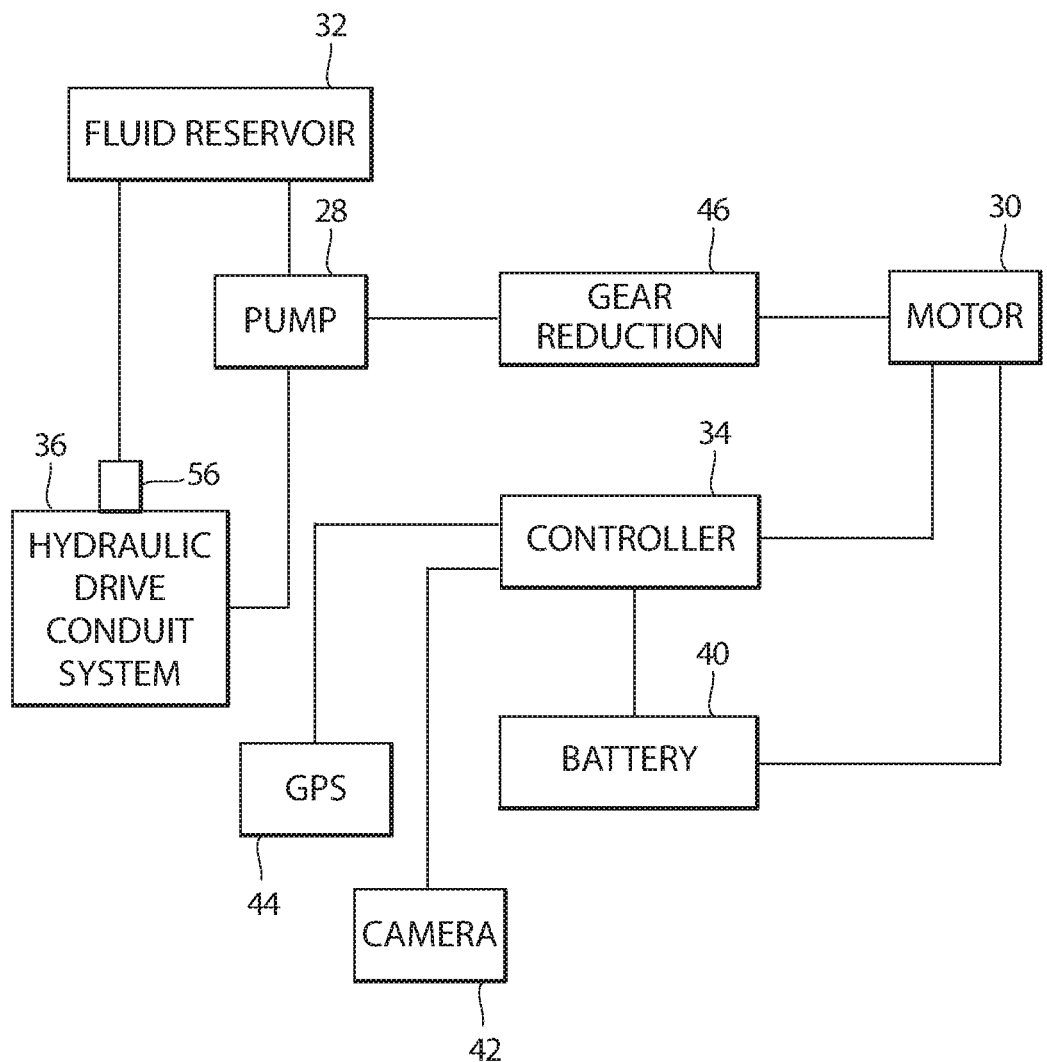
FIG. 2 is an exemplary block diagram for describing various parts of the tool shown in FIG. 1.

Referring to FIGS. 1 and 2, a battery-powered, hand held hydraulic tool 10 includes a handle assembly 20 that houses the hydraulic and electrical controls for the tool, seen in FIG. 2, and a working head assembly 60 that is operatively connected to the handle assembly 20. The handle assembly 20 includes a tool frame 22, a pump 28, a motor 30, a fluid reservoir 32, a controller 34, a hydraulic drive conduit system 36 and a battery 40. The tool frame 22 includes a hand grip portion 24 and a neck portion 26 in an in-line type shape. However, the tool frame 22 could be in any suitable type of shape, such as, for example, a pistol like shape or a suitcase type shape.

The pump 28, motor 30, fluid reservoir 32, controller 34 and hydraulic drive conduit system 36 are located within the grip portion 24 of the tool frame 22. The tool 10 may also include a camera 42, seen in block form in FIG. 2, mounted to the tool frame 22 and oriented to provide a video of a working area of the working head assembly 60. The tool 10 may also include a tool tracking system 44, seen in block form in FIG. 2, for tracking the location of the tool. In an exemplary embodiment, the tool tracking system 44 may include known GPS tracking components that receive GPS satellite signals and transmits the location of the tool 10 to a remote station (not shown) allowing a user to track the location of the tool. Such transmissions to remote stations may be achieved using known communication systems, such as for example, cell phone networks.

The battery 40 is removably connected to one end of the grip portion 24 of the tool frame 22. In another embodiment, the battery 40 could be removably mounted or connected to any suitable position on the tool frame 22. In another embodiment, the battery 40 may be affixed to the tool 10 so that it is not removable. The battery 40 shown is a rechargeable battery, such as a lithium ion battery, that can output a voltage of at least 16 VDC, and preferably in the range of between about 16 VDC and about 24 VDC. In the exemplary embodiment shown in FIG. 1, the battery 40 can output a voltage of about 18 VDC.

Continuing to refer to FIGS. 1 and 2, the motor 30 is coupled to the battery 40 and the controller 34, and its operation is controlled by the controller 34. Generally, the motor 30 is adapted to operate at a nominal voltage corresponding to the voltage of the battery 40, e.g., between about 16 VDC and about 24 VDC. For example, if the battery 40 is adapted to output a voltage of about 18 VDC, then the motor 30 would be adapted to operate at a voltage of about 18 VDC. Under a no-load condition, such a motor 30 can operate at about 21,000 rpm with a current of about 2.7 amps. At maximum efficiency, the motor 30 can operate at about 15,000 rpm with a current of about 12 amps, a torque of about 75 mN-m, and an output of about 165 W. An example of such an 18 VDC motor 30 is the RS-550VC-7030 motor, manufactured by Mabuchi Motor Co., Ltd. of Chiba-ken, Japan. However, as noted above, any suitable type of motor 30 adapted to operate above a 16 VDC nominal voltage could be used. As another example, the motor may be a motor adapted to operate at a 24 VDC nominal voltage. The output shaft of the motor 30 is connected to the pump 28 by a gear reduction assembly or gearbox 46, shown in block form in FIG. 2. Any suitable type of gear reduction assembly 46 could be used.

The grip portion 24 of the tool frame 22 includes one or more operator controls, such as switches 48 and 50, which can be manually activated by an operator. Grip portion 24 also includes a trigger lock 25. The grip portion 24 of the tool frame 22 may include a hand guard or hilt 52 that can protect an operator's hand while operating the tool 10. The hilt 52 may include a light 54, e.g., an LED, that is operatively connected to the controller 34 such that when a switch 48 or 50 is actuated the light 54 activates to illuminate the working area of the working head assembly 60. According to an embodiment of the present disclosure, one of the switches (e.g., switch 48) may be used to activate a piston (not shown) associated with the hydraulic drive system 36 to activate the working head assembly 60 such that the work head assembly moves toward a cutting position. The other switch (e.g., switch 50) may be used to retract the piston so that the working head assembly 60 moves to a home (or open) position, shown in FIG. 1. The operator controls, e.g., switches 48 and 50, are operably coupled to the controller 34.

The tool 10 may include a poppet valve 56, seen in block form in FIG. 2, connected to the hydraulic drive conduit system 36. The poppet valve 56 is adapted to open when the conduit system 36 reaches a predetermined minimum hydraulic pressure threshold, such as about 6,500 psi. When the poppet valve 56 opens, hydraulic fluid being pumped by the pump 28 can exit the conduit system 36 and return to the fluid reservoir 32. The poppet valve 56 can be adapted to generate an audible sound when it opens. This audible sound can signal to the operator that the tool 10 has reached its maximum predetermined hydraulic pressure and, thus, the action of the working head assembly 60, e.g., a cutting operation or cutting action, is completed.

In the exemplary embodiment shown in FIG. 2, the controller 36 is adapted to sense a current drop of electricity to the motor 30. When the poppet valve 56 opens, resistance to rotation of the motor 30 is reduced such that the motor draws less current. The controller 36 senses this current drop via a current sensor (not shown), and automatically deactivates the motor 30 for a predetermined period of time. In one embodiment, the predetermined period of time is between about 2 seconds and about 3 seconds. However, any suitable predetermined period of time could be set. In another embodiment, the controller 34 could be adapted to deactivate the motor 30 until a reset button (not shown) or reset like procedure is performed by the operator. With this type of system, an operator can sense via tactile feedback that the motor 30 and pump 28 have stopped and would not need to rely on an audible signal being heard or a visual signal from an LED 54 positioned on the tool 10.

Figure 3:
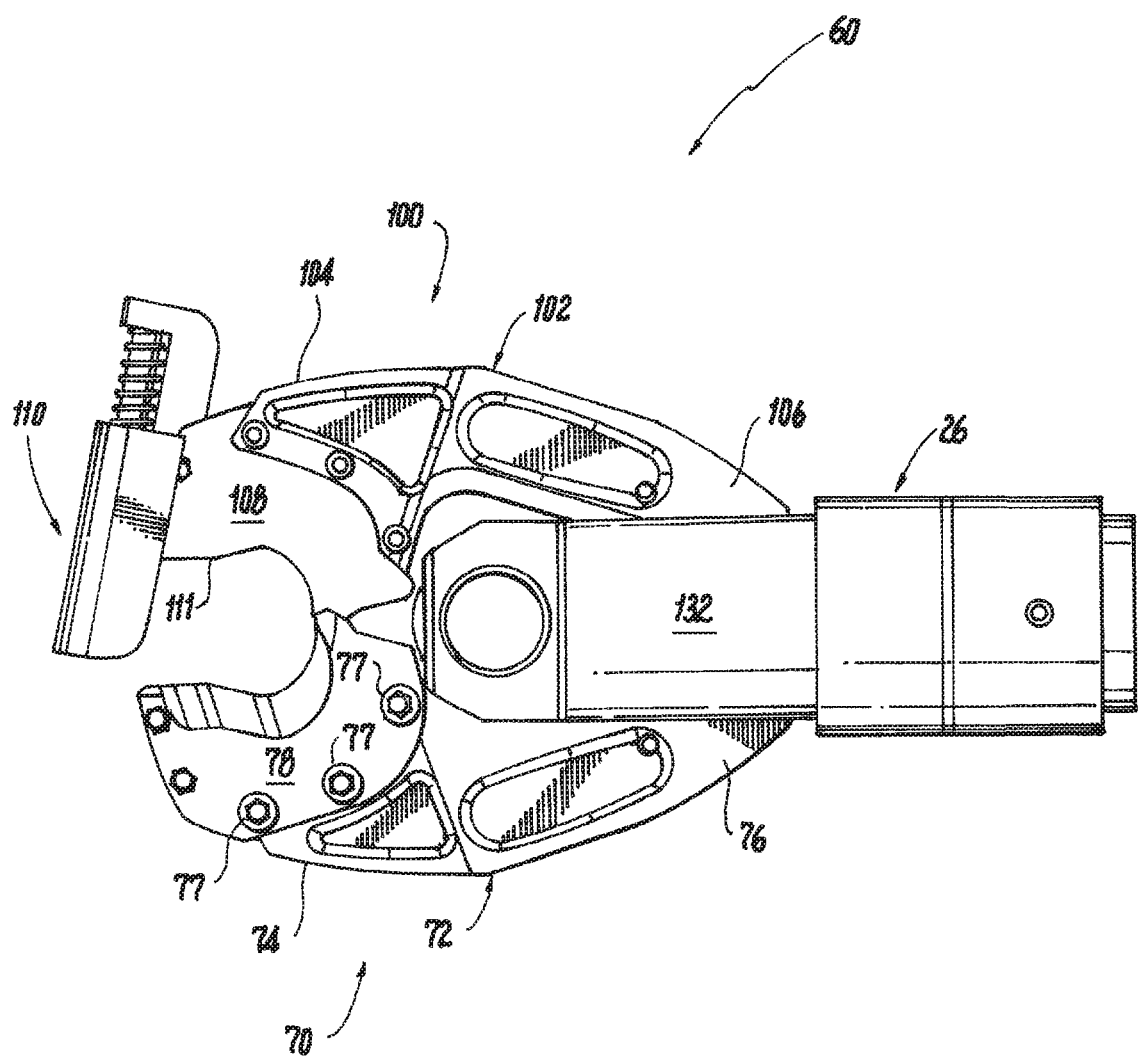
FIG. 3 is side elevation view of a first side of a working head assembly of the tool of FIG. 1, illustrating the working head in an open position and secured to a yoke of the handle assembly of the tool.
Figure 8:
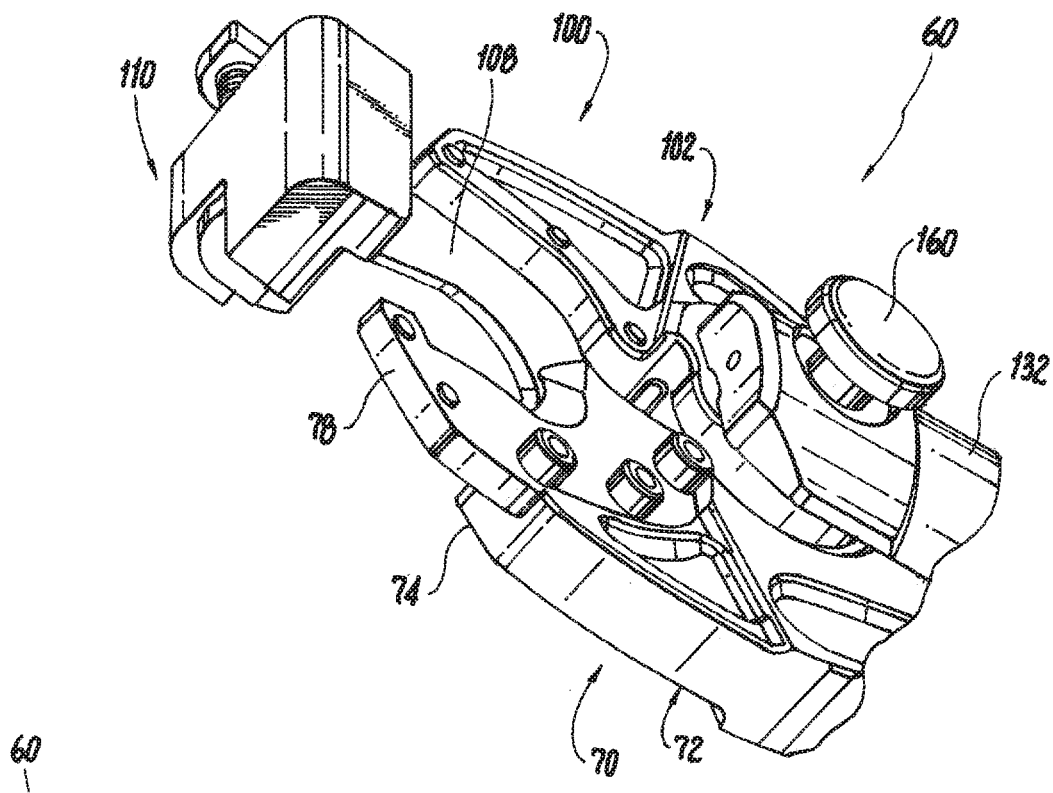
FIG. 8 is a top side perspective view of the first side of the working head assembly of FIG. 4 releasably secured to the yoke of the handle assembly.

In an exemplary embodiment, the working head assembly 60 includes a pair of cooperating jaw members; a first jaw member 70 and second jaw member 100. As shown on FIGS. 3 and 4, the first jaw member 70 includes a curved pressing lever 72 having a distal end portion 74 and a proximal end portion 76. An interior portion of the pressing lever 72 defines one or more working surfaces 78, e.g. a cutting surface or a cutting blade, having a cutting edge 79. For the purpose of the present disclosure the working surface 78 may also be referred to as the cutting blade 78. The cutting blade 78 may be a replaceable cutting blade attached to the jaw member 70 with, for example, mechanical fasteners 77, seen in FIG. 3, or spring locking fasteners, or the cutting blade 78 can be formed directly into the curved pressing lever 72 such that the cutting blade 78 is a permanent cutting blade or monolithically formed into the curved pressing lever 72. Similarly, the second jaw member 100 includes a curved pressing lever 102 having a distal end portion 104 and a proximal end portion 106. An interior portion of the pressing lever 102 defines one or more working surfaces 108, e.g. a cutting surface or cutting blade, having a cutting edge 111. For the purpose of the present disclosure the working surface 108 may also be referred to as the cutting blade 108. The cutting blade 108 may be a replaceable cutting blade attached to the second jaw member 100 with, for example, mechanical fasteners 109, seen in FIG. 6, or spring locking fasteners, or the cutting blade can be formed directly into the curved pressing lever 102 such that the cutting blade 108 is a permanent cutting blade or monolithically formed into the curved pressing lever 102. The first jaw member 70 or the second jaw member 100 may also include an optional guide member 110. In the exemplary embodiment shown, the guide member 110 is attached to the cutting blade 108 or the distal end portion 104 of the jaw member 100. The guide member 110 is provided to guide the cutting blades 78 and 108 of the working head assembly 60 and to limit the cutting blades 78 and 108 from separating, spreading apart, rotating or otherwise becoming misaligned when in the working head assembly 60 is activated, i.e., during a cutting operation or cutting action.

Referring to FIGS. 4-7, the first jaw member 70 and the second jaw member 100 can be connected to one another using a number of know mechanical configurations that form pivot point members that when joined form a pivot point about which the jaw members may rotate. As non-limiting examples, jaw members 70 and 100 can be connected to one another using a tongue in groove type configuration or clevis, tang and pin type configuration. In the exemplary embodiment shown, the jaw members 70 and 100 are connected to one another using the clevis, tang and pin type configuration. In this exemplary embodiment the tang would form one pivot point member and the clevis would form another pivot point member that when joined by the pin operatively couple the first jaw member 70 to the second jaw member 100 so that the jaw members can rotate about the pin. More specifically and referring to FIG. 7, the first jaw member 70 includes a tang 80 having a bore 82, and the second jaw member 100 includes a clevis 112 having bores 114 and 116 through the sides of the clevis 112, as shown. In this configuration, to connect the jaw members 70 and 100 together the tang 80 is positioned within the clevis 112.

A sleeve or bushing 150 having a central opening 152 is disposed within the bores 82, 114 and 116, seen in FIGS. 5 and 7. The sleeve 150 holds the two jaw members 70 and 100 together until a locking pin 160, seen in FIGS. 13 and 15, connects the jaw members to the neck portion 26 of the handle assembly 20 of the tool 10. The sleeve 150 allows the locking pin to slide through one continuous surface when connecting the jaw members 70 and 100 to the neck portion which permits easier installation of the jaw members 70 and 100 to the handle assembly 20. In other words, the sleeve 150 allows the locking pin 160 to glide through areas or seams where the jaw members 70 and 100 meet without catching on a jaw member in the event the jaw members 70 and 100 are slightly offset, misaligned or have gaps. Additionally, the sleeve 150 keeps the jaw members 70 and 100 of the working head assembly 60 together for easier handling when the locking pin 160 is removed from the tool 10, as discussed below.

As shown in the exemplary embodiment of FIGS. 6-9, the jaw members 70 and 100 are configured to open and close relative to one another using the clevis, tang and locking pin type configuration described above. The clevis 112 and tang 80 arrangement allow the jaw members 70 and 100 to pivot around sleeve 150 and thus the locking pin 160 such that the jaw members can move between open and cutting positions. When moving the jaw members 70 and 100 to the open position, seen in FIG. 6, the jaw members 70 and 100 pivot causing the cutting blades 78 and 108 to move away from each other to permit a conductor 300, seen in FIG. 26, to be inserted between the cutting blades 78 and 108 of the jaw members 70 and 100. When moving the jaw members 70 and 100 to the cutting position, the jaw members pivot causing the cutting blades 78 and 108 to advance towards each other and subsequently passing one another to complete the cutting operation.

Using the clevis, tang and pin type configuration described herein (or the tongue-and-groove type configuration) allows the working head assembly 60 to maintain the forces acting on the jaw members 70 and 100 symmetrically as well as reduces the stress on the jaw members, so as to allow a smaller, lighter weight design of the working head assembly 60. Specifically, as will be appreciated by one of ordinary skill in the art, prior art jaws are designed as hermaphroditic pairs. As such, similar to a pair of ordinary scissors attempting to cut a piece of cardboard, the forces and tolerances lead to binding and bending and other problems from the asymmetric application of forces. With the clevis, tang and pin type configuration (or the tongue-and-groove type configuration), all of the forces are symmetrically applied to the jaws. In addition, this configuration allows for tighter tolerances to further enhance performance of the operating jaw members 70 and 100.

The lighter weight design of the jaws 70 and 100 is also achieved, at least in part, on some embodiments by the provision of one or more "pockets" or areas where the cross section of each jaw member 70 and 100 is thinner in a desired shape. For example, in the embodiment shown, the first jaw member 70 has pockets 84 on one or both sides of the jaw member 70, and the second jaw member 100 has pockets 118 on one or both sides of the jaw member. These pockets 84 and 118 not only serve as weight reduction pockets but can also absorb stress in a more uniform manner across the operative portions of the jaw members 70 and 100. One of ordinary skill in the art armed with the present specification can design the pockets of any suitable size and shape depending on the material of construction and overall design of the jaws through routine experimentation in order to achieve one or more of the advantageous features of the weight reduction pockets.

In addition, as shown in FIGS. 4 and 10, a lighter weight design is also achieved by tapering at least the distal end portion 74 of the first jaw member 70 and the distal end portion 104 of the second jaw member 100. In an exemplary embodiment shown in FIGS. 4 and 10, the distal end portions 74 and 104 are tapered in a generally I-shaped configuration where the jaw member tapers at a predefined angle, such as for example a 6-degree angle. The variable cross-section of the distal end portions 74 and 104 of the jaw members 70 and 100, respectively, reduces weight by reducing the material used to form the jaw members. Additionally, as will be appreciated by one of ordinary skill in the art, the casting process is not only made easier by the tapered configuration, but also results in a superior product. Specifically, tapering the mold used to cast the jaw members 70 and 100 helps the flow of material when casting the jaw members. The tapering allows the material to cool evenly from the edges inwardly, as opposed to cooling in patches that can occur without a taper. The present disclosure also contemplates that the tapering allows the flow rates and pressure of the fabrication process to be optimized to a point that the material does not start cooling before it spreads throughout the casting mold. This, in turn, facilitates the even cooling from the edges inward.

While a generally I-shaped configuration with a predefined taper, e.g., a 6-degree taper, is shown for portions of the jaw members, one of ordinary skill in the art would appreciated that any suitable configuration that lessons the weight and/or improves the fabrication of the jaw members 70 and 100 while not compromising strength should be understood to be within the scope of the present application. One of ordinary skill in the art would readily appreciate that during a working operation of the jaw members 70 and 100 of the working head assembly 60, the proximal end portion 76 or 106 of each jaw member 70 or 100, respectively, typically receives more stress so that the proximal end portions of the jaw members 70 and 100 are preferably fabricated to be thicker. Further, tapering along the length or a portion of the length of the jaw members 70 and 100 as described herein facilitates a uniform distribution of the forces on applied to the jaw members. One of ordinary skill in the art armed with the present disclosure can configure jaw members 70 and 100 with the tapering and/or pockets described herein in a manner to achieve one or more of the uniform stress distribution and weight reduction features described based on the ultimate design and material of construction of the jaw members.

Referring now to FIGS. 11-21, the jaw members 70 and 100 are configured for easy connection to and removal from the handle assembly 20 of the tool 10. As shown, the proximal end portion 76 of the first jaw member 70 includes a raised tab 86 on one or both sides of the jaw member 70, and the proximal end portion 106 of the second end portion 100 includes a raised tab 120 on one or both sides of the jaw member 70. The raised tabs 86 and 120 serve as stops. More specifically, the raised tabs 86 and 120 are preferably positioned to facilitate connecting the jaw members 70 and 100 of the working head assembly 60 to the handle assembly 20 by allowing the jaw members 70 and 100 to only open an amount that results in the locking pin 160 being aligned with the central opening 152 of the sleeve 150, thus freeing the hands of a user when connecting the working head assembly 60 to the handle assembly 20 or when removing the working head assembly 60 from the handle assembly 20. A user can now allow the jaw members 70 and 100 to release and fall open as shown in FIGS. 10-20, leaving the jaws aligned.

In addition, in the exemplary embodiment shown, each raised tab 86 and 120 are sized and configured to mate with a respective tab notch 130 provided in an inner surface of a yoke 132 of the neck portion of the handle assembly 20. When the raised tabs 86 and 120 are positioned in their respective tab notches 130 the bores 82, 114 and 116 are aligned so that the sleeve 150 and locking pin 160 can connect the jaw members 70 and 100 to the yoke 132, and allows one roller 134, seen in FIG. 10, positioned within the yoke 132 to come in contact with cam surface 88 on the first jaw member 70, and allows another roller 136, seen in FIG. 11, positioned within the yoke 132 to come in contact with cam surface 122 on the second jaw member 100.

Figure 13:
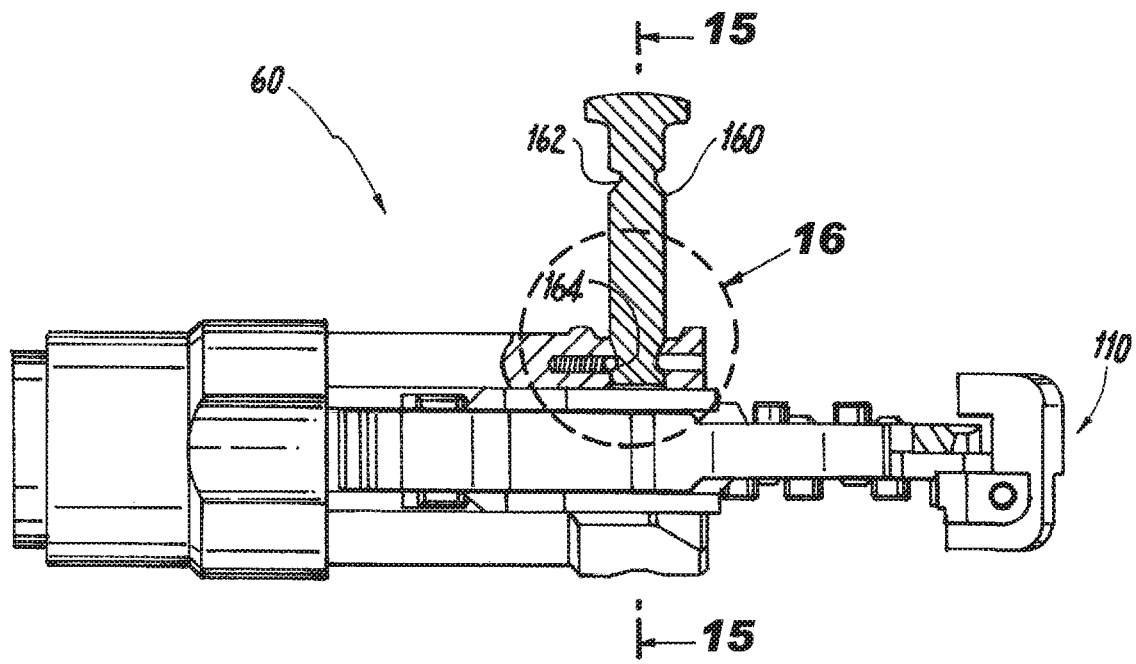
FIG. 13 is a top plan view of the working head assembly and yoke of FIG. 11, illustrating a locking pin used to releasably secure jaws of the working head assembly together and to the yoke of the handle assembly.
Figure 14:
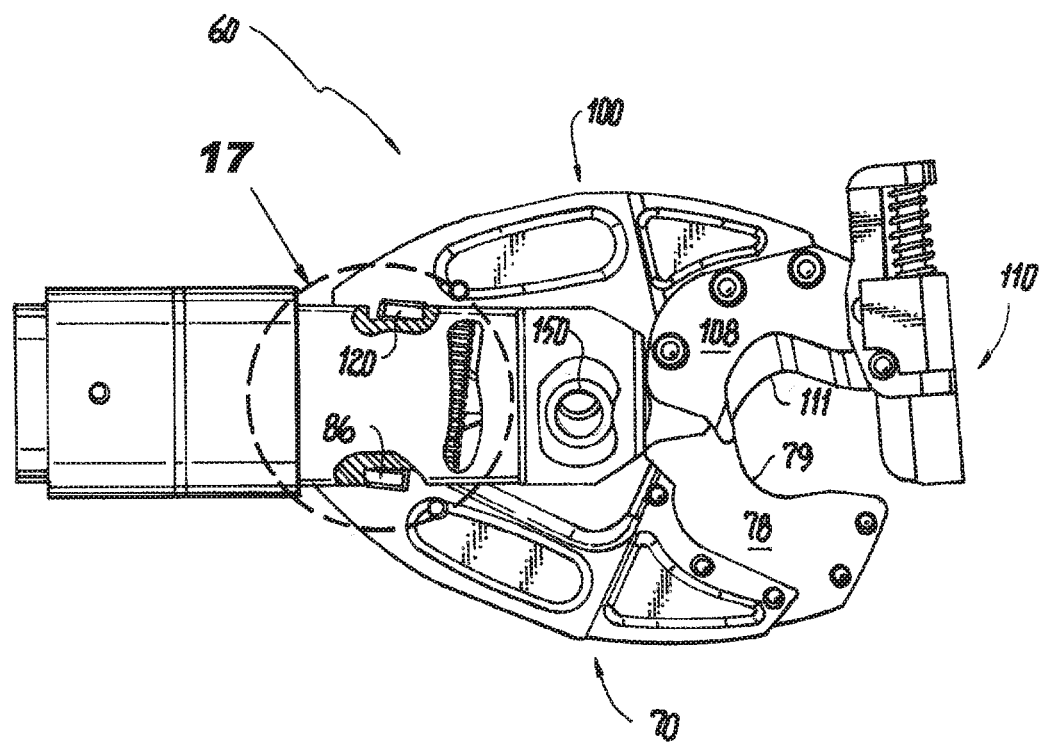
FIG. 14 is a side elevation view in partial cut-away of the second side of the working head assembly and the yoke of the handle assembly of FIG. 11.
Figure 15:
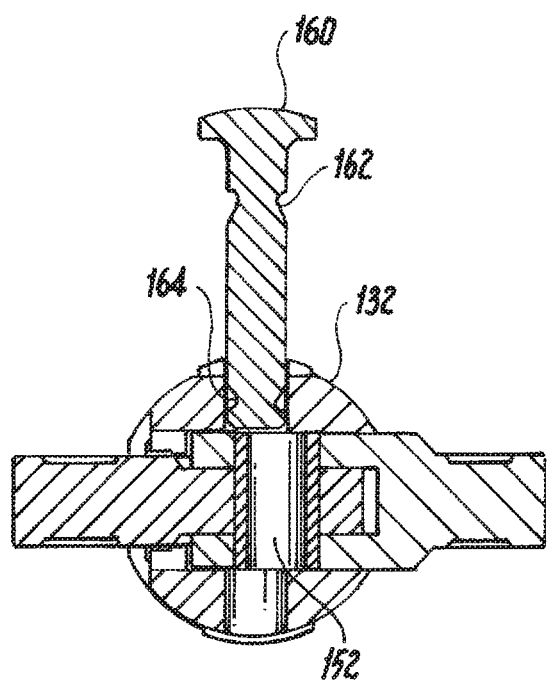
FIG. 15 is a cross-sectional view of the working head assembly and the yoke of the handle assembly of FIG. 13 taken along line 15-15.
Figure 16:
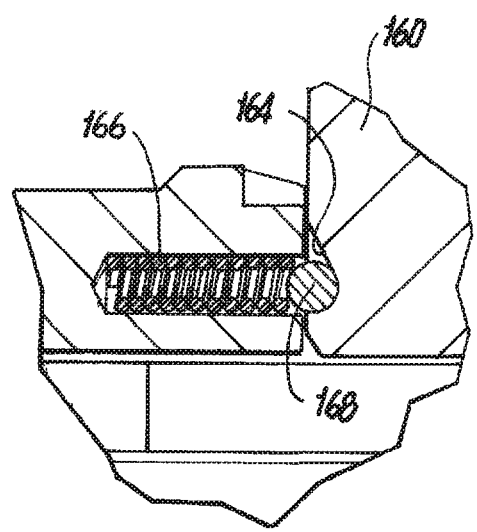
FIG. 16 is an enlarged view in partial cross-section of the working head assembly and the yoke of the handle assembly of FIG. 13 taken from detail 16.

As noted above, the working head assembly 60 is releasably secured to the neck portion 26 of the handle assembly 20 via the locking pin 160. As shown in FIGS. 13, 15 and 16, the locking pin 160 can move between an extended position, seen in FIG. 13, and an inserted position, seen in FIGS. 8 and 9. The locking pin 160 includes a first detent 162 around the perimeter of the pin 160 and a second detent 164 around the perimeter of the pin 160. The detents 162 and 164 interact with a spring and ball assembly, e.g., spring 166 and ball 168. The spring 166 and ball 168 are positioned within a bore 170 in one of the jaw members 70 or 100, as shown in FIG. 16. The spring 166 normally biases the ball 168 toward the locking pin 160. When the locking pin 160 is in the inserted position, the ball 168 is biased into detent 162 to lock the locking pin 160 in the inserted position. When the locking pin 160 is in the extended position, the ball 168 is biased into detent 164 to lock the locking pin 160 in the extended position.

Figure 9:
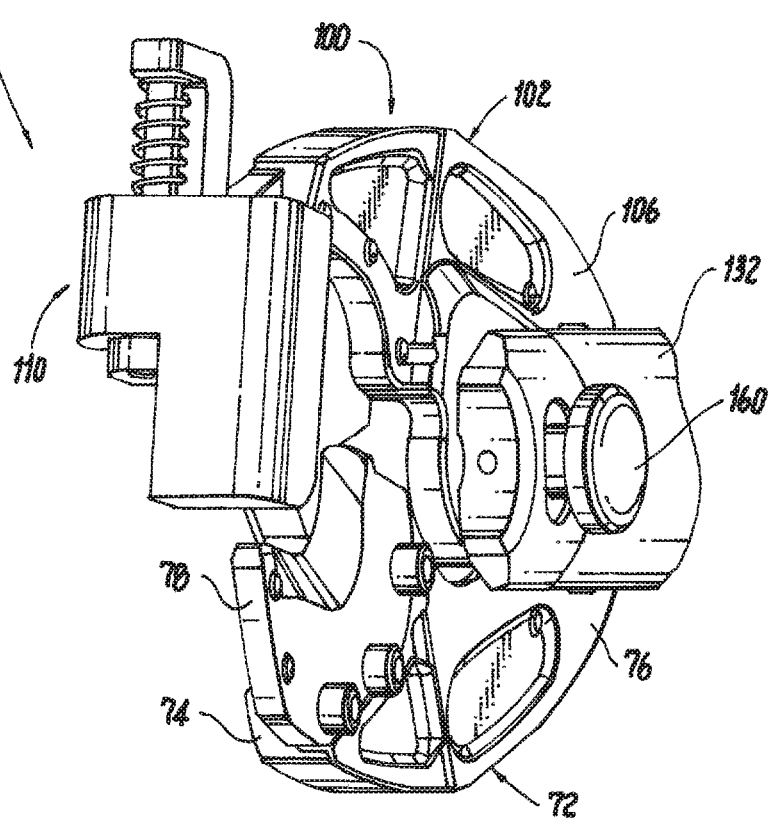
FIG. 9 is a top perspective view of the first side of the working head assembly and the yoke of the handle assembly of FIG. 8.
Figure 11:
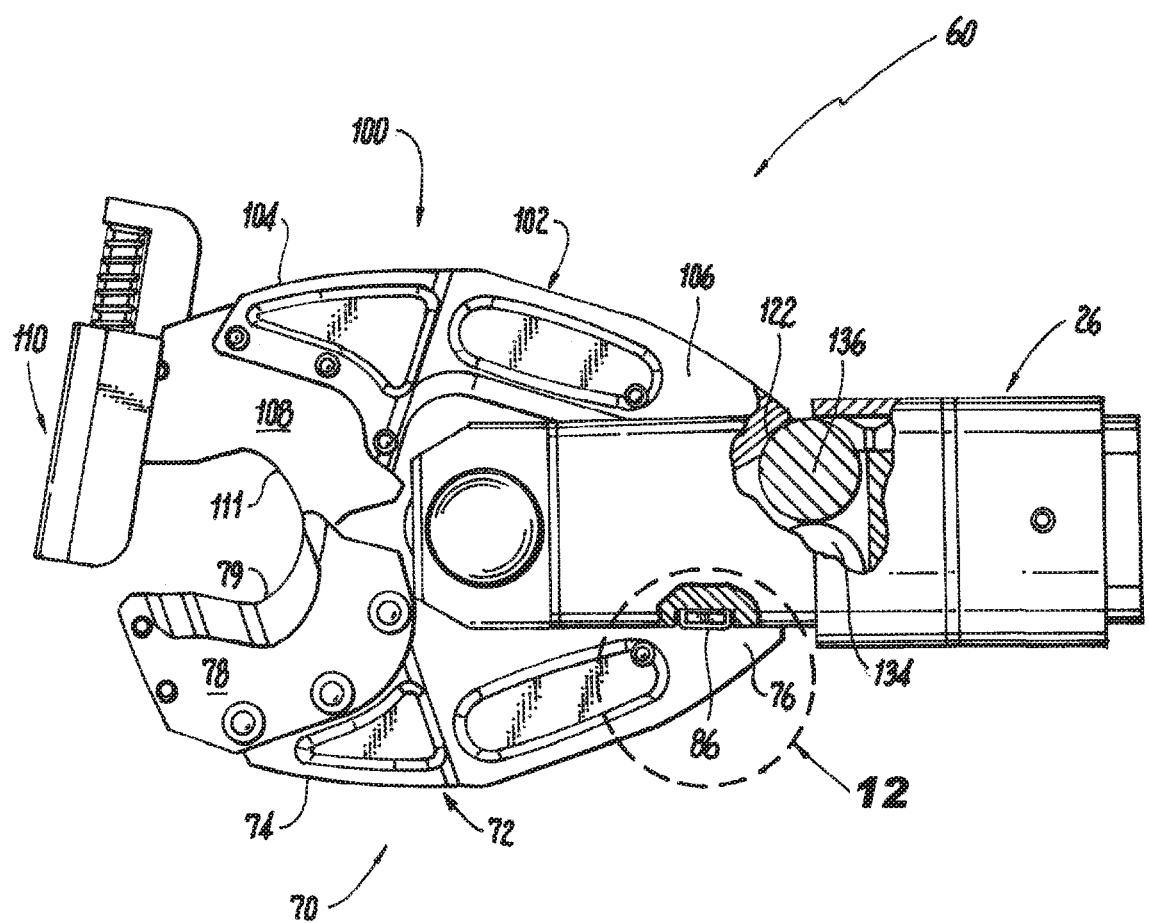
FIG. 11 is side elevation view in partial cut-away of the first side of the working head assembly of the tool of FIG. 1 in an open position and releasably secured to the yoke of the handle assembly.
Figure 12:
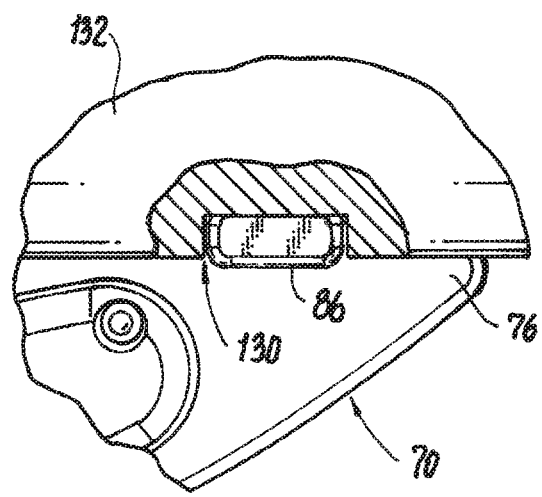
FIG. 12 is an enlarged view of a portion of the working head assembly and yoke of the handle assembly of FIG. 11 taken from detail 12.
Figure 17:
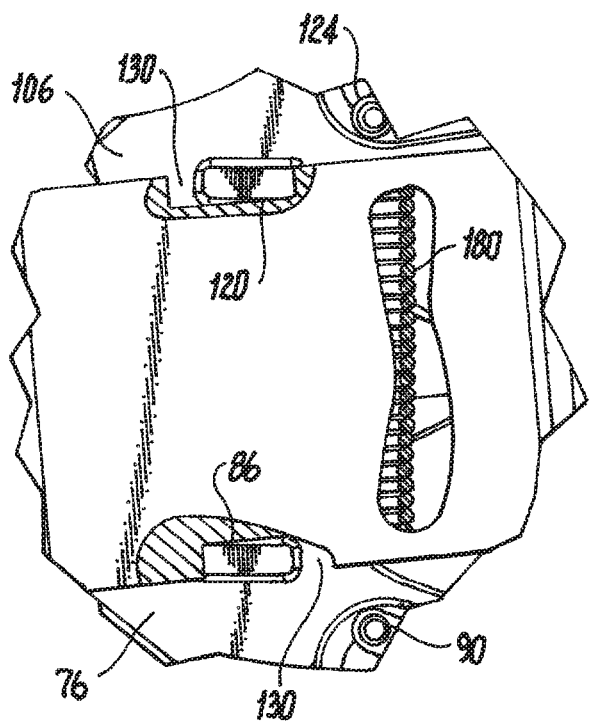
FIG. 17 is an enlarge side elevation view of a portion of the working head assembly and the yoke of the handle assembly of FIG. 14 taken from detail 17.
Figure 18:
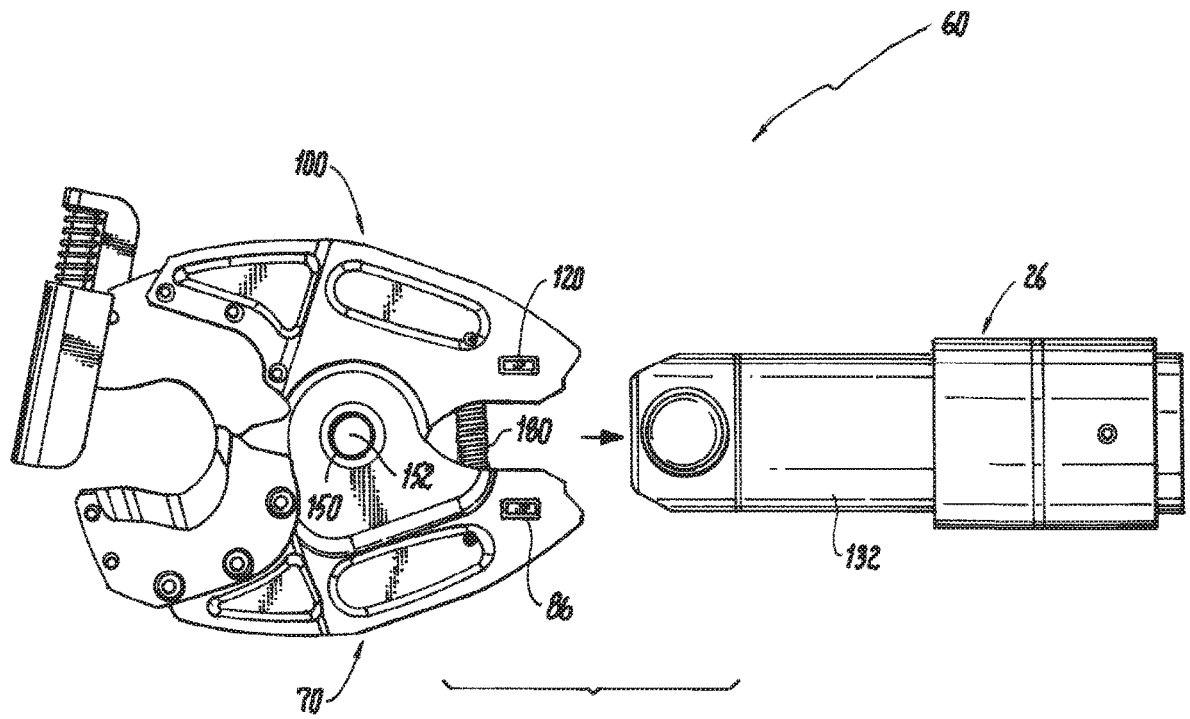
FIG. 18 is a side elevation view of the first side of the working head assembly separated from the yoke of the handle assembly of the tool of FIG. 1.
Figure 19:
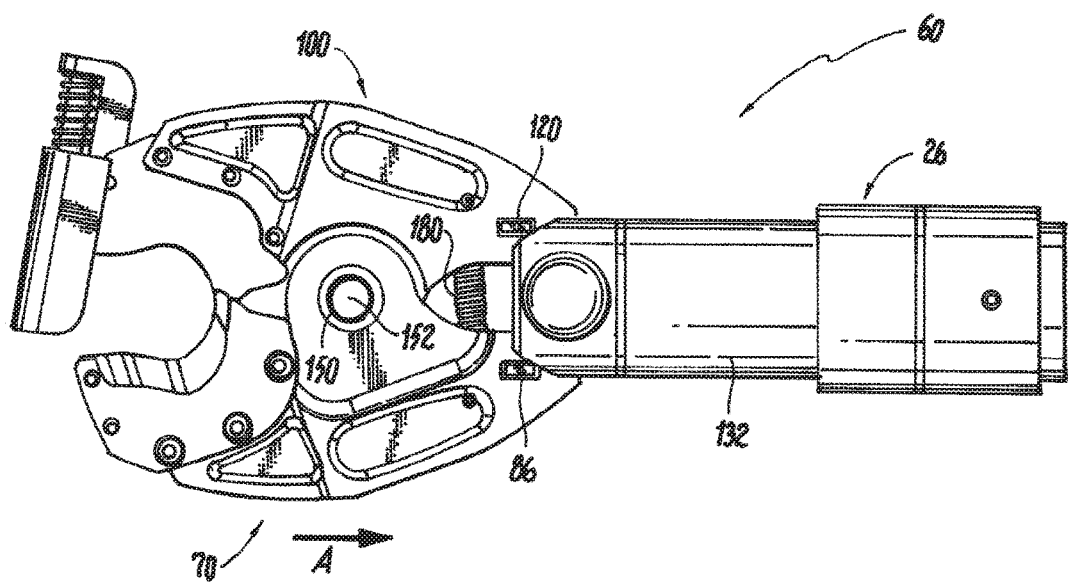
FIG. 19 is a side elevation view of the first side of the working head assembly moving toward and engaging the yoke of the handle assembly of the tool of FIG. 1.
Figure 20:
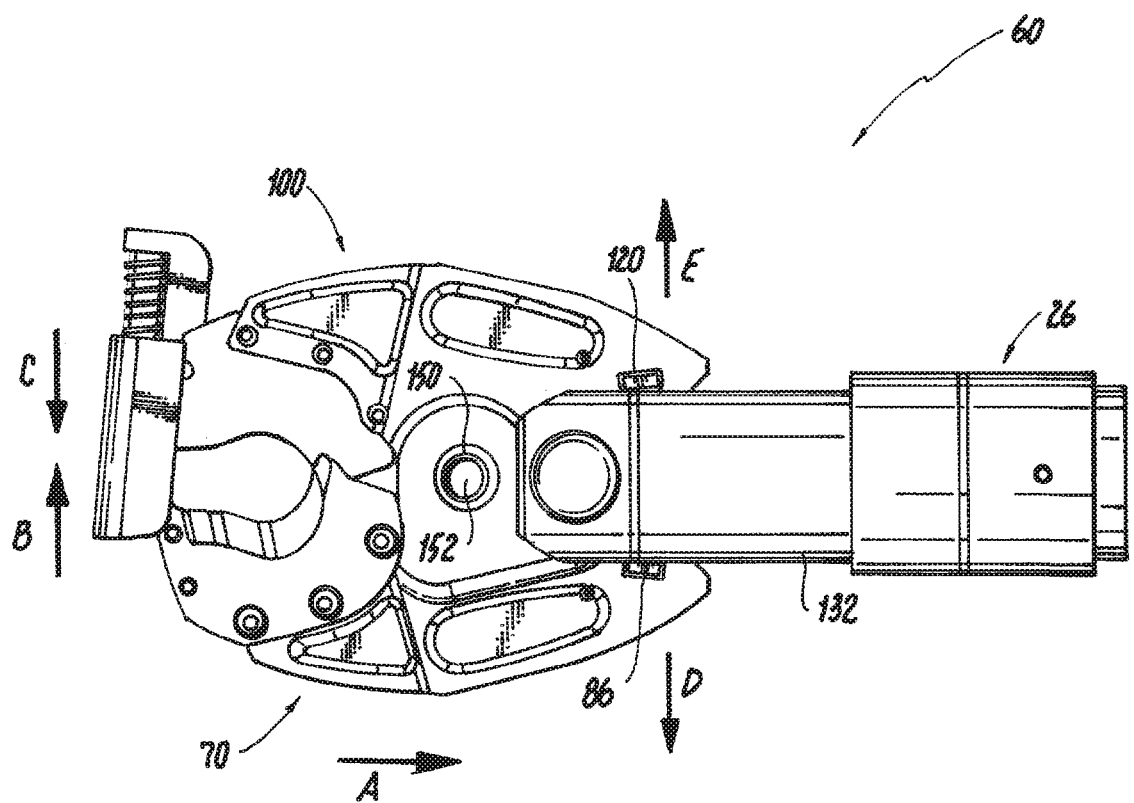
FIG. 20 is a side elevation view of the first side of the working head assembly engaging the yoke of the handle assembly of the tool of FIG. 1, illustrating a distal end of jaws of the working head assembly being moved toward each other.
Figure 21:
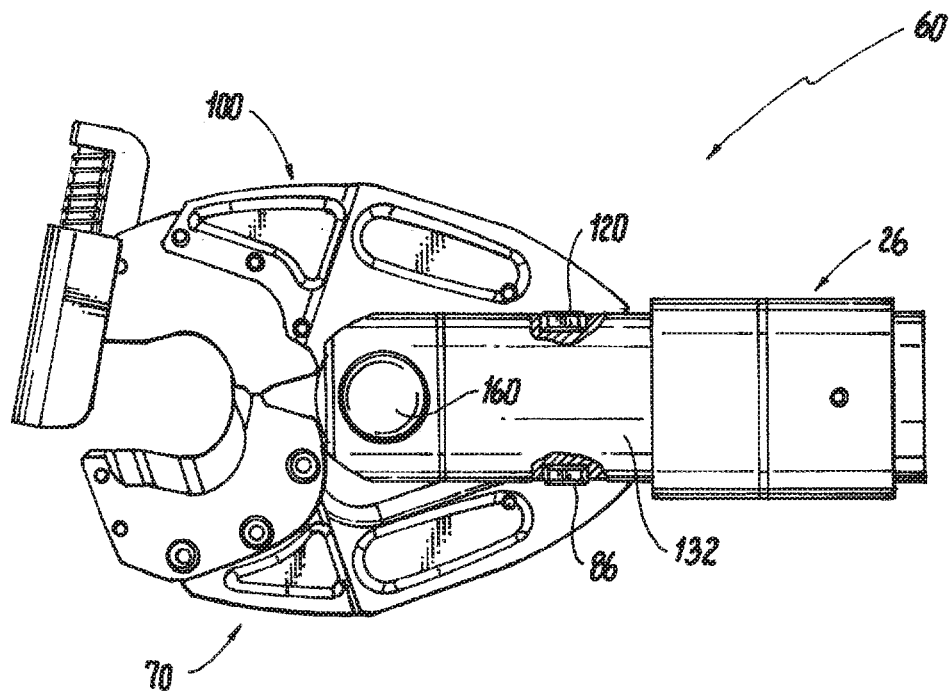
FIG. 21 is a side elevation view of the first side of the working head assembly fully engaged with the yoke of the handle assembly of the tool of FIG. 1.
Figure 22:
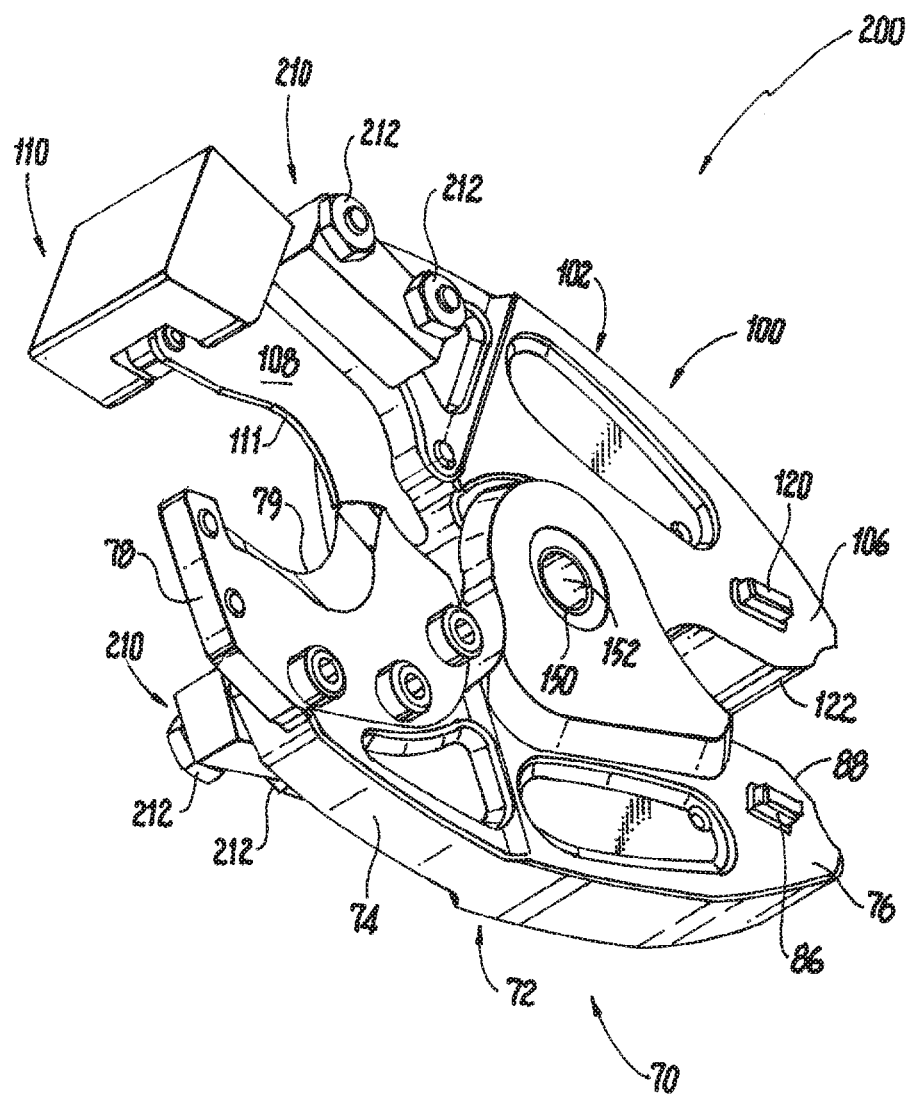
FIG. 22 is a top side perspective view of a second side of another exemplary embodiment of the working head assembly of the tool of FIG. 1.
Figures 23, 24:
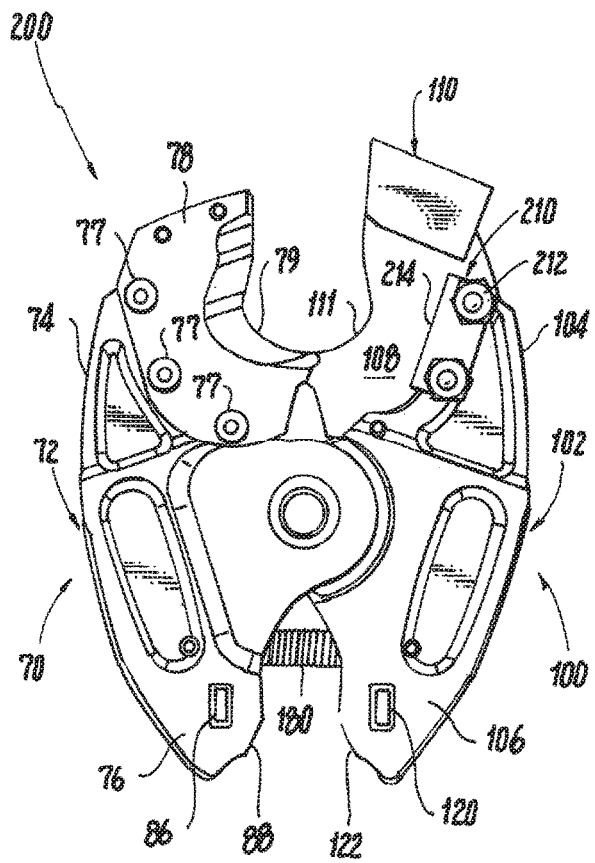
FIG. 23 is a side elevation view of the second side of the working head assembly of FIG. 22 with jaw members of the working head assembly in an open position.
FIG. 24 is a side elevation view of the working head assembly of FIG. 22, illustrating the jaw members of the working head assembly moving toward a cutting position.
Figure 25:
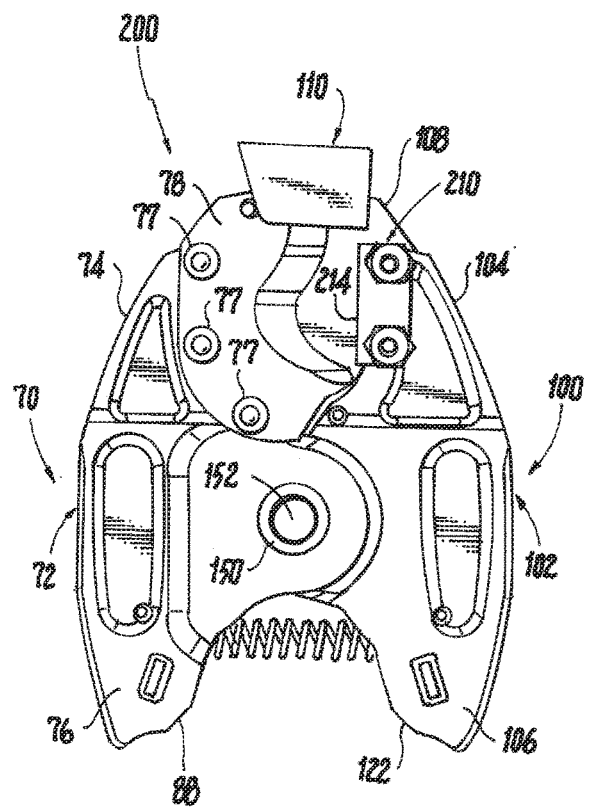
FIG. 25 is a side elevation view of the working head assembly of FIG. 22, illustrating the jaw members of the working head assembly in the cutting position.

When the raised tabs 86 and 120, seen in FIG. 17, are positioned into their respective tab notches 130, the jaw members 70 and 100 are prevented from falling out of the yoke 132 of the neck portion 26 of the handle assembly 20 when the locking pin 160 is in the extended position. Additionally, when the locking pin 160 is in the extended position such that the locking pin 160 is removed from the bore holes in the jaw members 70 and 100, the jaw members 70 and 100 not only remain connected to the yoke 132, but also spring tension from spring member 180, seen in FIGS. 16-21, coupled between the distal end portions 76 and 106 as shown in FIG. 9 of the jaw members 70 and 100, respectively, causes the raised tabs 86 and 120 to be held within the tab notches 130 in the yoke 132. One end of the spring member 180 is connected to the distal end portion 76 of the first jaw member 70 and the opposing end of the spring member 180 is connected to the distal end portion 106 of the second jaw member 100 by a connection accessed through spring pin holes 90 and 124 in the respective jaw member. As will be appreciated, the spring member 180 normally bias the jaw members 70 and 100 toward the open position.

As noted above, as shown in FIGS. 17-21, if the locking pin 160 is moved to the extended position, described above, and the jaw members 70 and 100 are removed from the yoke 132, the jaw members 70 and 100 are still held together by the sleeve 150. The jaw members 70 and 100 may move slightly, but once the raised tabs 86 and 120 are positioned in their respective tab notches 130, the jaw members 70 and 100 are held in place.

Various embodiments of the present disclosure lend themselves to the provision of additional advantageous features. For example, the tool 10 may make use of a trigger lock 25, seen in FIG. 1, that can slide relative to the switches 48 and 50 to prevent activation of the switches 48 and 50 for added safety. The trigger lock 25 can be configured to require release for every operation of the working head assembly 60, such as the working operation of cutting blades for a cutting tool 10 or the working operation of crimping dies for a crimping tool. Similarly, the tool 10 could use a planetary gear box 46, seen in FIG. 2, that would provide lower ratio/less torque and tangential forces which results in the need for fewer bearings.

Turning now to FIGS. 22-31, another exemplary embodiment of a working head assembly according to the present disclosure is shown. In this exemplary embodiment, the working head assembly 200 is substantially similar to the working head assembly 60 described above such that like components will be given the same reference numbers and will not be described for this exemplary embodiment. In this exemplary embodiment, the working head assembly 200 includes a pair of cooperating jaw members; a first jaw member 70 and second jaw member 100. One or both jaw members 70 and 100 may include one or more conductor stabilizers 210. The conductor stabilizers 210 are provided to limit rotation of a conductor 300 positioned between the cutting blades 78 and 108 during a cutting operation. For ease of description, the conductor stabilizers 210 may also be referred to as the stabilizers in the plural or the stabilizer in the singular.

Figure 33:
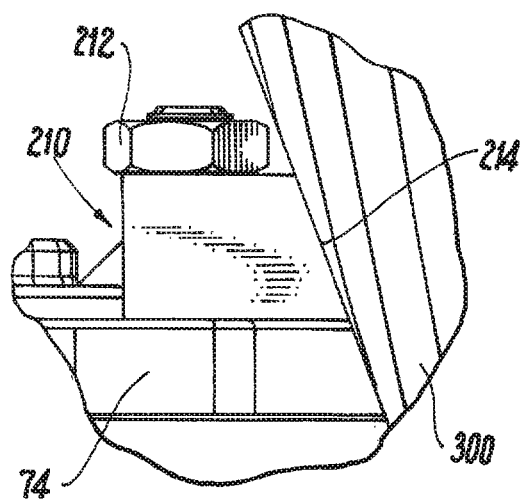
FIG. 33 is an enlarged view of a portion of the tool of FIG. 32 similar to FIG. 31, illustrating the rotation limiting stabilizer engaging the conductor to limit the rotation of the conductor as the cutting blades cut through the conductor.
Figure 34:
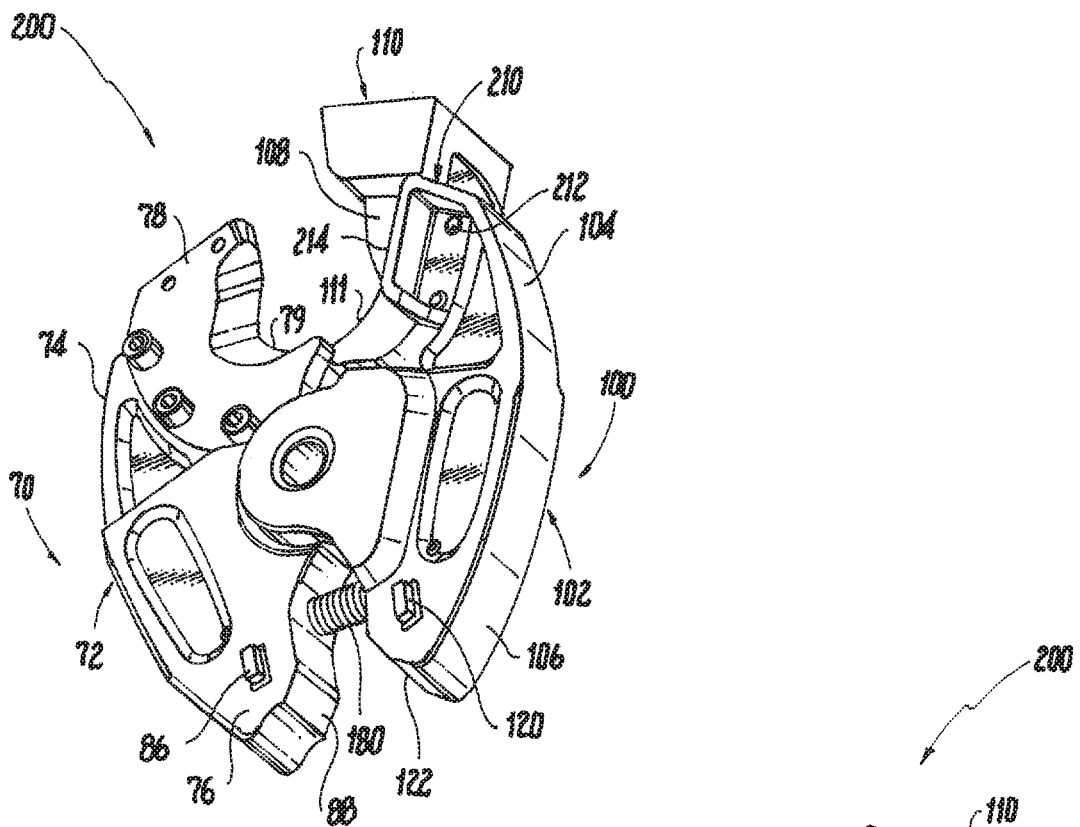
FIG. 34 is a bottom perspective view of a first side of another exemplary embodiment of the working head assembly of the tool of FIG. 1, illustrating the jaw members of the working head assembly in an open position.
Figure 35:
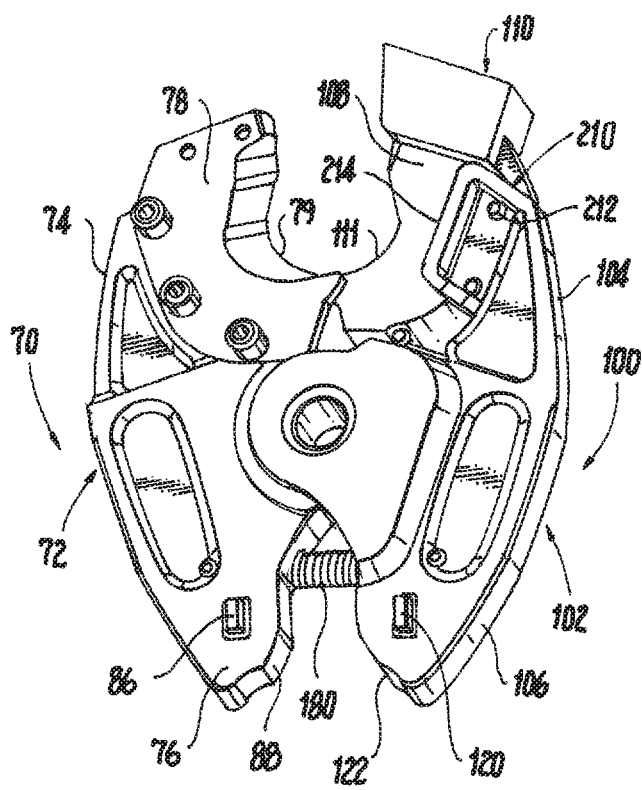
FIG. 35 is another bottom perspective view of the first side of the working head assembly of FIG. 34.
Figure 36:
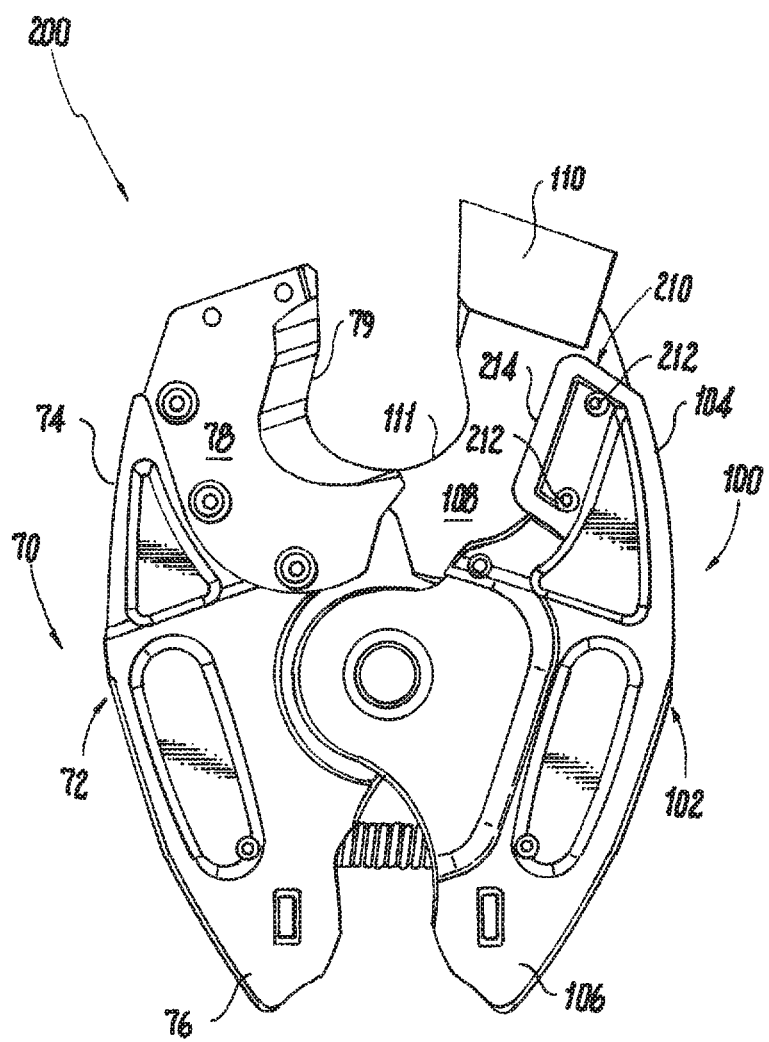
FIG. 36 is a side elevation view of the first side of the working head assembly of FIG. 34.
Figure 37:
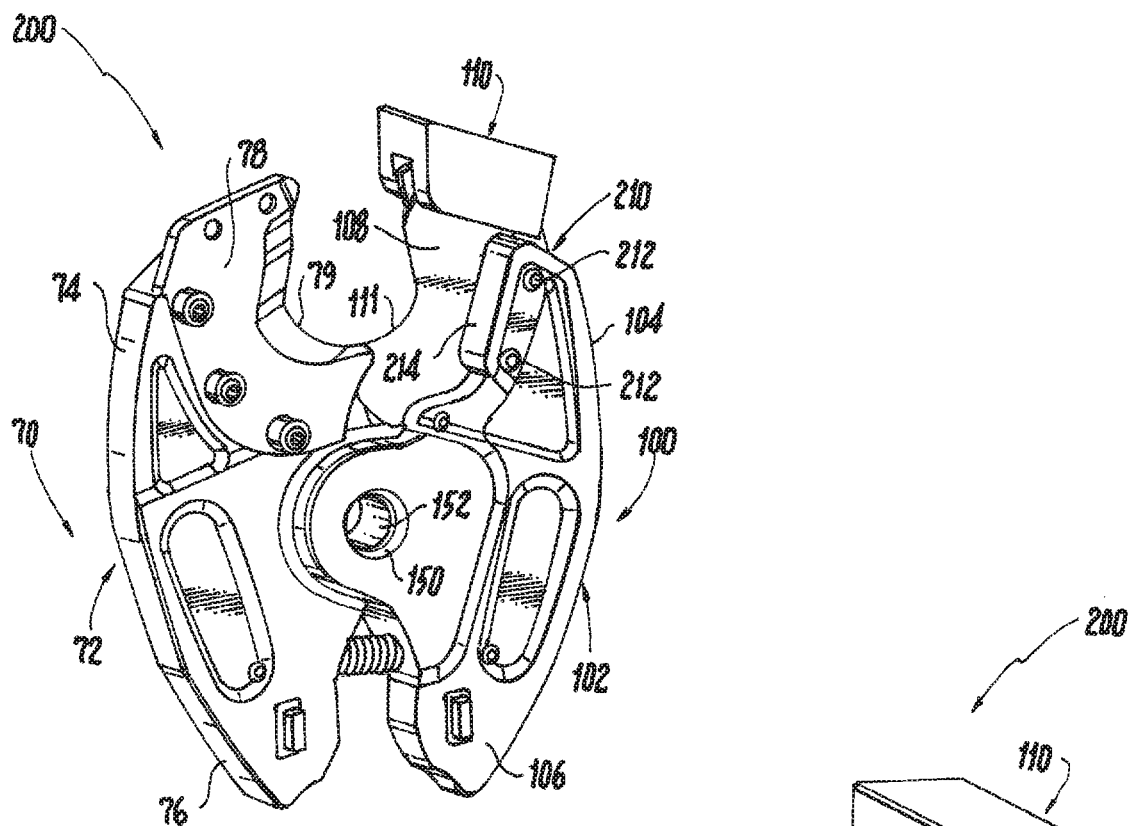
FIG. 37 is a side perspective view of the first side of the working head assembly of FIG. 34.

In the exemplary embodiments shown in FIGS. 22-44, each jaw member 70 and 100 includes a stabilizer 210. The stabilizers 210 may be replaceable stabilizers attached to the jaw member 70 or 100 with, for example, mechanical fasteners, such as a nut and bolt or rivet 212, welds or high strength adhesives, as seen in FIGS. 22-31. In another embodiment, the stabilizers 210 may be formed directly into the distal end portion 74 or 104 of the respective curved pressing lever 72 or 102, such that the stabilizer 210 is a permanent stabilizer or monolithically formed into the curved pressing lever, as seen in FIGS. 32-36. In another embodiment, the stabilizers 210 may be secured to or formed directly into the cutting blades 78 and 108. Each stabilizer 210 may come in any shape or size sufficient to limit the rotation of an object, e.g., a conductor, during a cutting operation, as described herein. In the embodiment shown in FIGS. 22-31, the stabilizer 210 is a solid rectangular shaped member with through holes used to secure the stabilizer 210 to the jaw member 70 or 100. In the embodiment shown in FIGS. 32 and 33, the stabilizer 210 is a solid rectangular shaped member with through holes used to secure the stabilizer 210 to the jaw member 70 or 100 and a sloped or beveled conductor contacting surface 214 to provide additional surface area to contact the conductor 300 when cutting a conductor 300 as seen in FIG. 33. In the embodiment shown in FIGS. 34-38, the stabilizer 210 is a U-shaped member with a flat conductor contacting surface 214. The stabilizer 210 may be made of a metallic material or non-metallic material. Non-limiting examples of metallic materials include steel, aluminum and titanium. Non-limiting examples of non-metallic materials include carbon fiber, and polymer materials.

Figure 29:
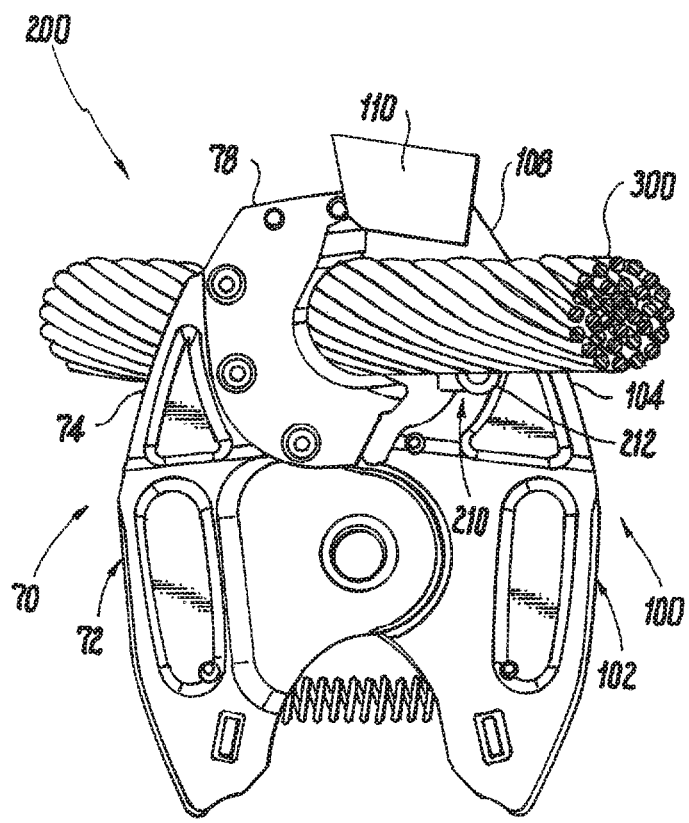
FIG. 29 is a side elevation view of the working head assembly of FIG. 27, illustrating the jaw members of the working head assembly moving toward the cutting position with the cutting blades in contact with the conductor, and illustrating the conductor rotating as the cutting blades cut through the conductor.
Figure 30:
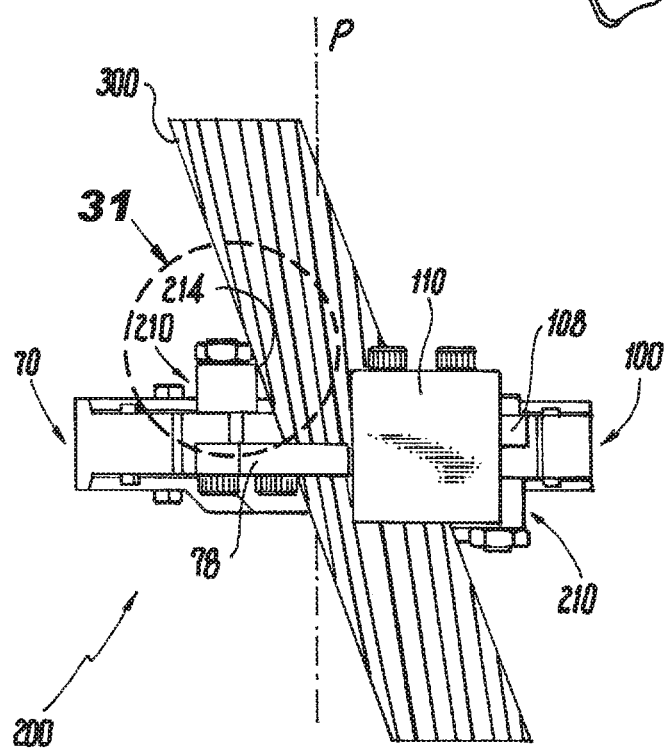
FIG. 30 is a top plan view of the working head assembly of FIG. 29, illustrating a rotation limiting stabilizer limiting the rotation of the conductor as the cutting blades cut through the conductor.
Figure 31:
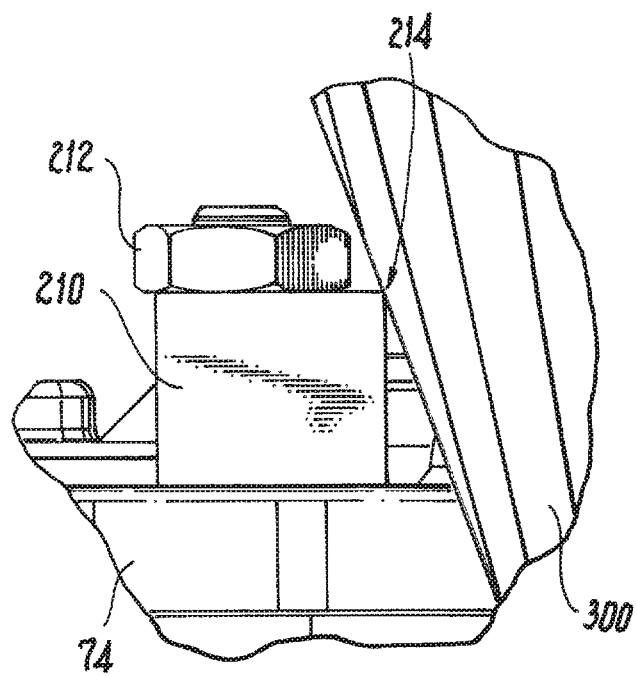
FIG. 31 is an enlarged view of a portion of the tool of FIG. 30 taken from detail 31, illustrating the rotation limiting stabilizer engaging the conductor to limit the rotation of the conductor as the cutting blades cut through the conductor.
Figure 32:
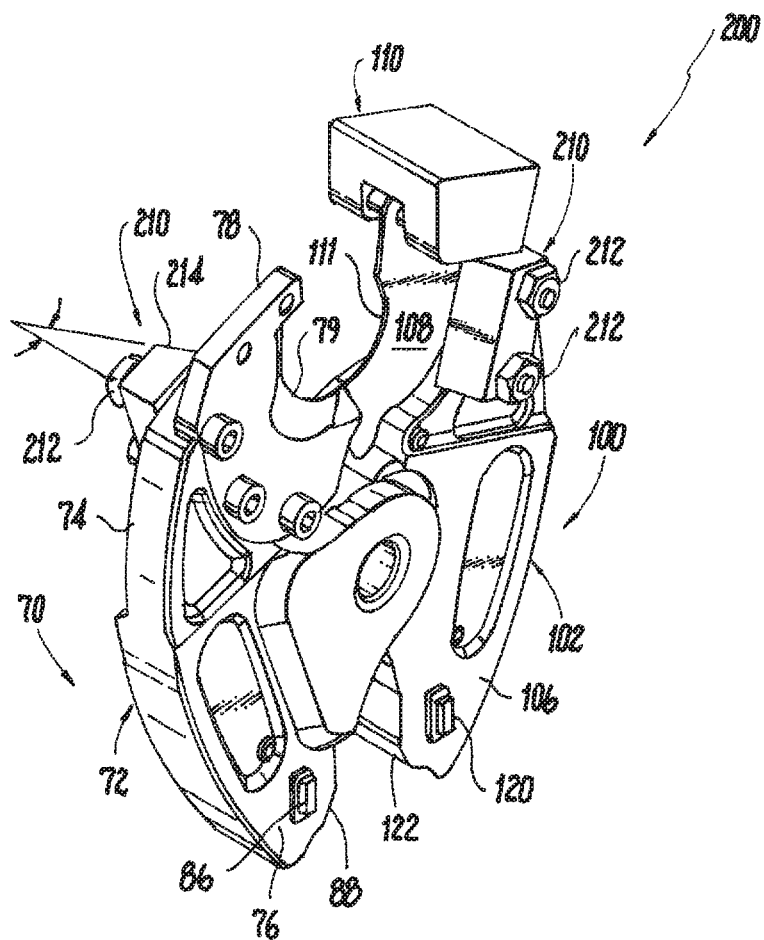
FIG. 32 is a top side perspective view of a second side of another exemplary embodiment of the working head assembly of the tool of FIG. 1, illustrating another exemplary embodiment of the rotation limiting stabilizer.
Figure 38:
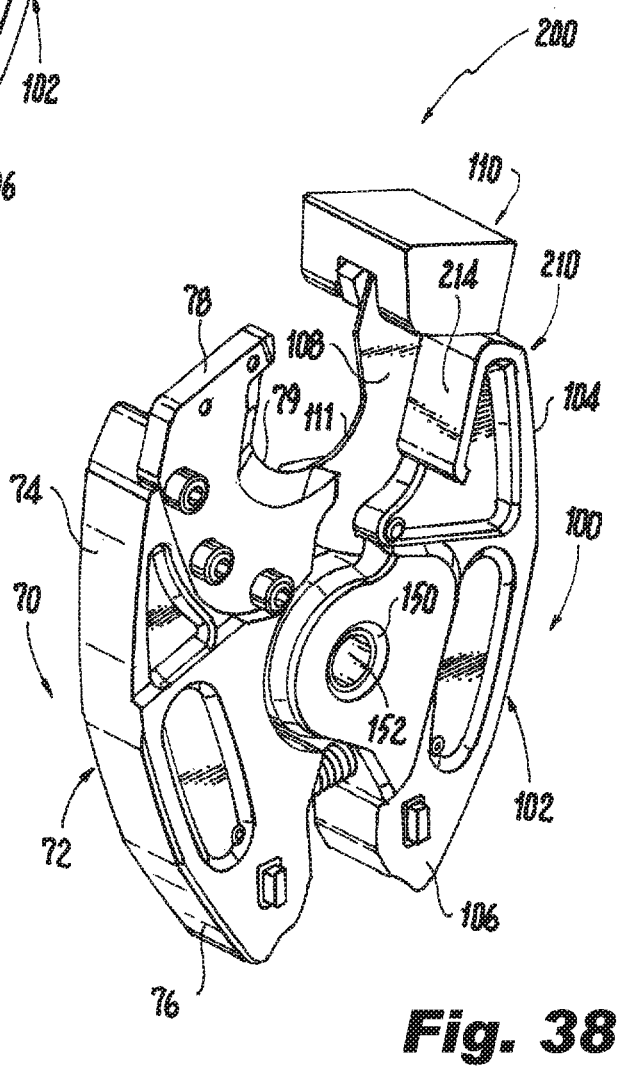
FIG. 38 is a top perspective view of the first side of the working head assembly of FIG. 34.

In the embodiment shown in FIGS. 22-31, the stabilizer 210 associated with the jaw member 70 is secured to the distal end portion 74 of the curved pressing lever 72 and is positioned so that a conductor 300 contacting edge or surface 214, seen in FIG. 31, or conductor contacting edge or surface 214, seen in FIG. 33, or conductor contacting edge or surface 214, seen in FIG. 38, of the stabilizer 210 is aligned to engage the conductor 300 during a cutting operation as described below. Similarly, stabilizer 210 associated with the jaw member 100 is secured to the distal end portion 104 of the curved pressing lever 102 and is positioned so that a conductor contacting edge or surface 214 of the stabilizer 210 is aligned to engage the conductor 300 during a cutting operation as described below. It is noted that the distance from the cutting edges 79 and 111 of the cutting blades 78 and 108 to the conductor contacting edge or surface 214 of the stabilizer 210 may vary depending upon the size of the cable or conductor 300 being cut. For example, for smaller diameter cables or conductors 300 the distance from the cutting edges 79 and 111 of the cutting blades 78 and 108 to the conductor contacting edge or surface 214 of the stabilizer 210 should be shorter to ensure the conductor contacting edge or surface 214 contacts the conductor 300 sufficient to limit rotation of a conductor 300 positioned between the cutting blades 78 and 108 during a cutting operation. As another example, for larger diameter cables or conductors 300 the distance from the cutting edges 79 and 111 of the cutting blades 78 and 108 to the conductor contacting edge or surface 214 of the stabilizer 210 should be larger to ensure the conductor contacting edge or surface 214 contacts the conductor 300 sufficient to limit rotation of a conductor 300 positioned between the cutting blades 78 and 108 during a cutting operation.

Figure 26:
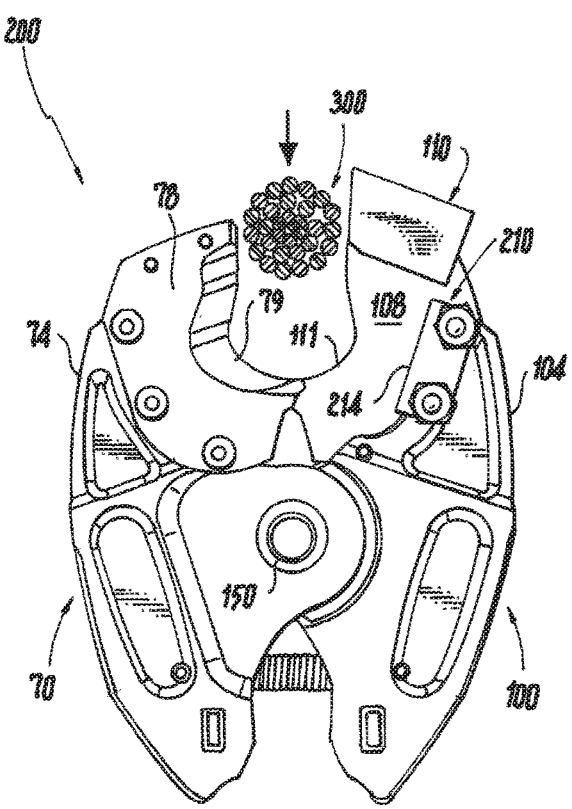
FIG. 26 is a side elevation view of the working head assembly of FIG. 22, illustrating the jaw members of the working head assembly in the open position and a conductor being inserted between cutting blades of the jaw members.
Figure 27:
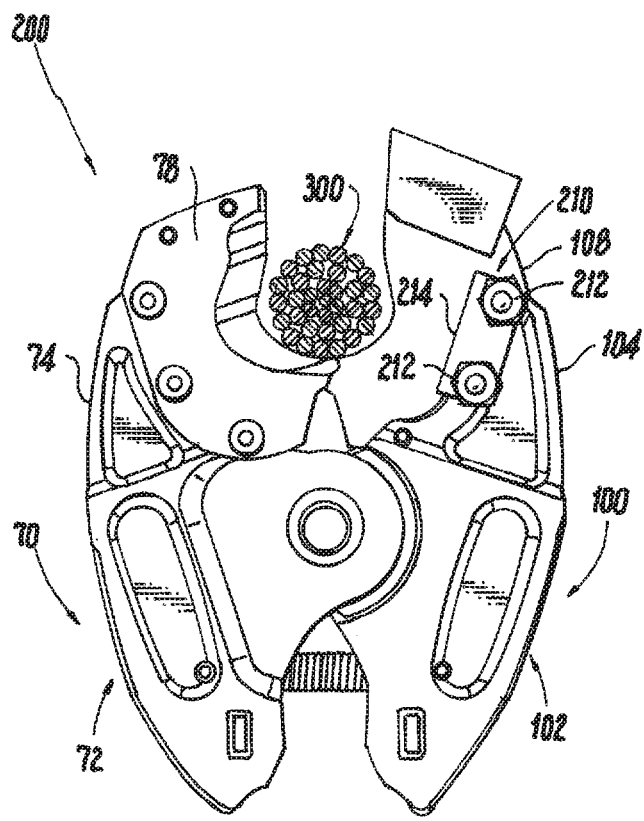
FIG. 27 is a side elevation view of the working head assembly of FIG. 22, illustrating the jaw members of the working head assembly in the open position and a conductor between the cutting blades of the jaw members.
Figure 28:
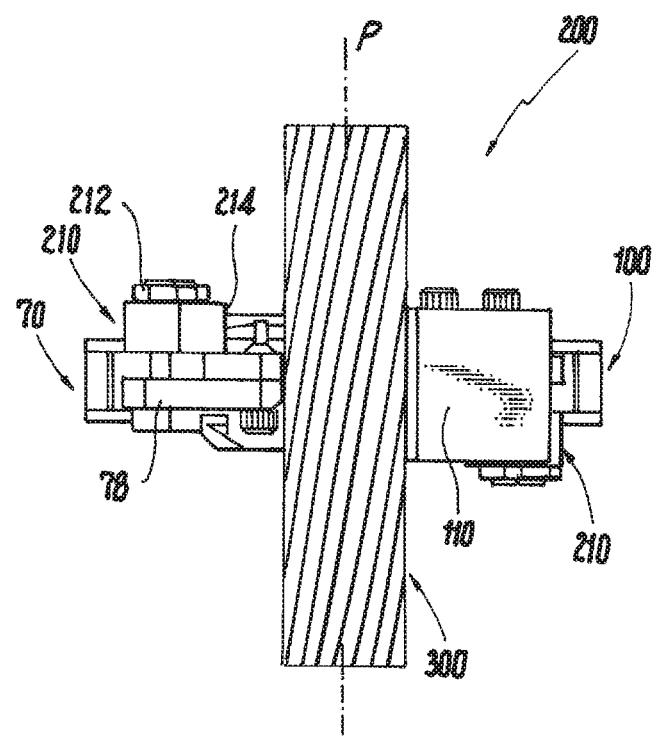
FIG. 28 is a top plan view of the working head assembly of FIG. 27, illustrating the conductor between the cutting blades of the jaw members.

The operation of one exemplary embodiment of the stabilizers 210 will be described with reference to FIGS. 26-33. With the jaw members 70 and 100 in the open position, a conductor 300 is inserted between the jaw members such that the conductor generally aligns with an axis "P," as seen in FIGS. 26-28. The axis "P," seen in FIG. 28, is generally perpendicular to the cutting edges 79 and 111 of the cutting blades 78 and 108, respectively. The tool 10 is then activated, via for example operator controls 48 and/or 50, seen in FIG. 1, so that the jaw members 70 and 100 begin a cutting operation where the jaw members 70 and 100 move toward the cutting position, as seen in FIGS. 29 and 30. As the cutting blades 78 and 108 cut through the conductor 300, the conductor 300 may begin to rotate so that it is offset from the axis "P," as seen in FIG. 30. Minimal rotation may be acceptable, however, once the rotation of the conductor exceeds a threshold offset angle from axis "P" represented by angle "β," seen in FIG. 43, the cutting blades 78 and 108 may begin to separate so as to decrease the efficiency of the cut and/or the life cycle of the cutting edges 79 and 111 of the cutting blades 78 and 108. When the conductor reaches the threshold angle "β" the conductor 300 engages the conductor contacting edge 214, seen in FIG. 30, or conductor contacting surface 214, seen in FIG. 33, of each stabilizer 210, which limits or prevents further rotation of the conductor 300. As a non-limiting example, the threshold angle "β" may be in the range of about 15 degrees and about 25 degrees. Limiting or preventing rotation of the conductor 300 permits the cutting blades 78 and 108 to complete the cutting operation without separating and/or without degrading the efficiency of the cut and/or without degrading the life cycle of the cutting edges 79 and 111.

Figure 39:
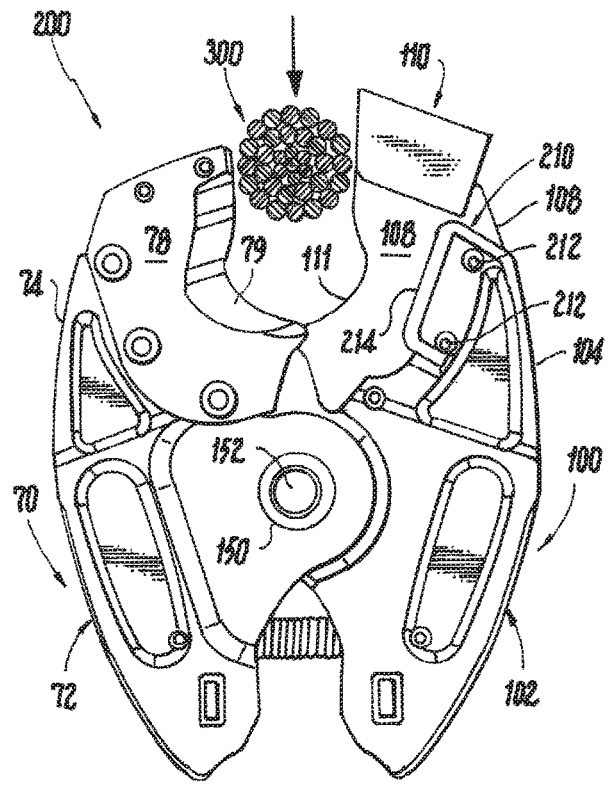
FIG. 39 is a side elevation view of the working head assembly of FIG. 34, illustrating the jaw members of the working head assembly in the open position and a conductor being inserted between cutting blades of the jaw members.
Figure 40:
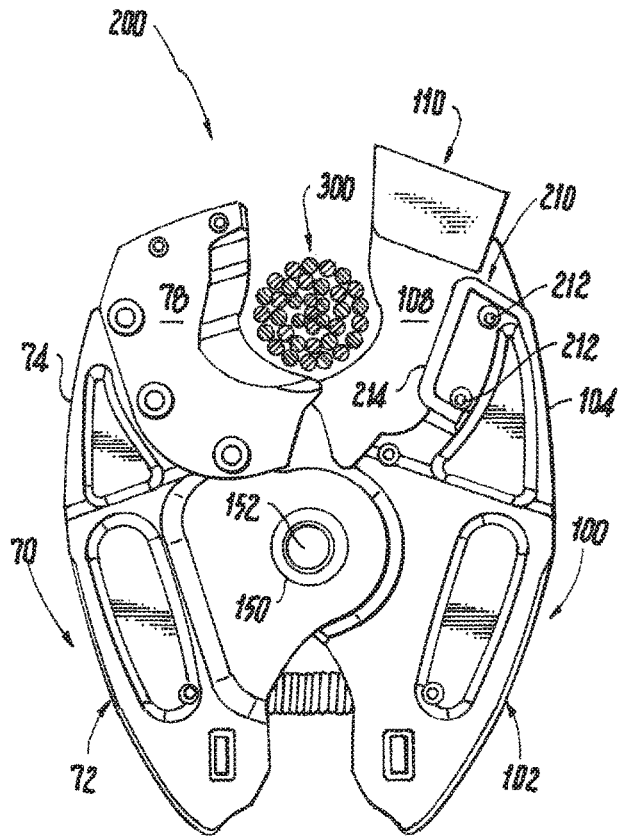
FIG. 40 is a side elevation view of the working head assembly of FIG. 34, illustrating the jaw members of the working head assembly in the open position and a conductor between the cutting blades of the jaw members.
Figure 41:
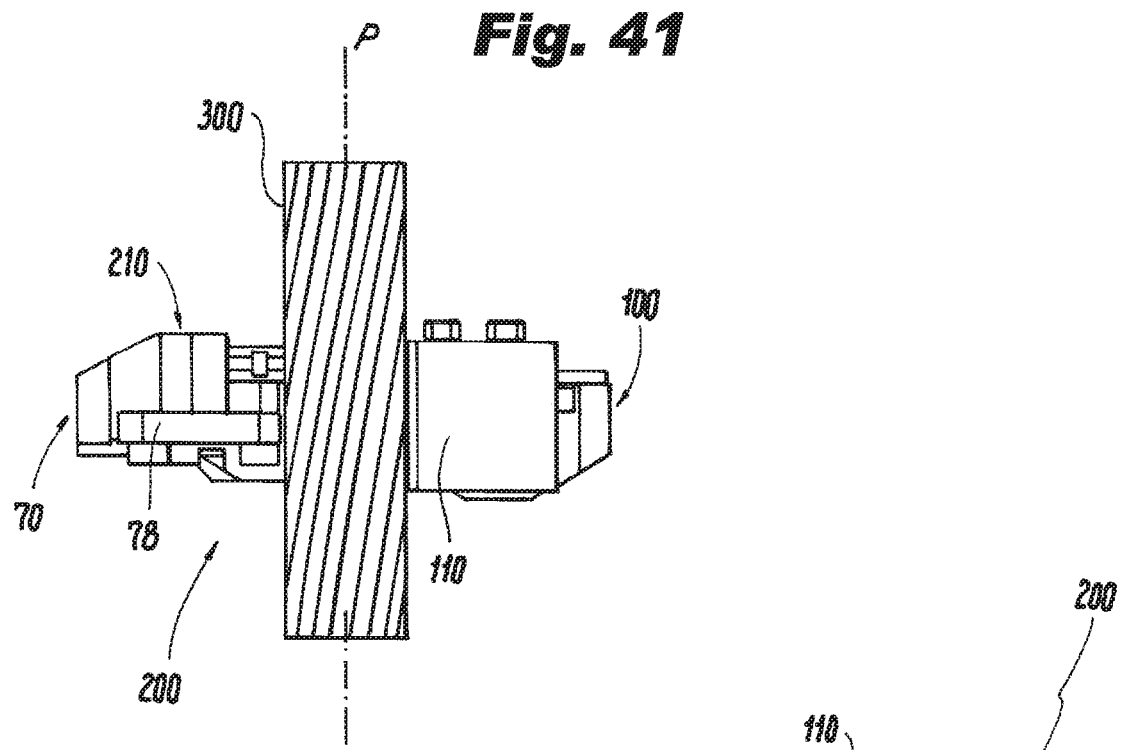
FIG. 41 is a top plan view of the working head assembly of FIG. 40, illustrating the conductor between the cutting blades of the jaw members.
Figure 42:
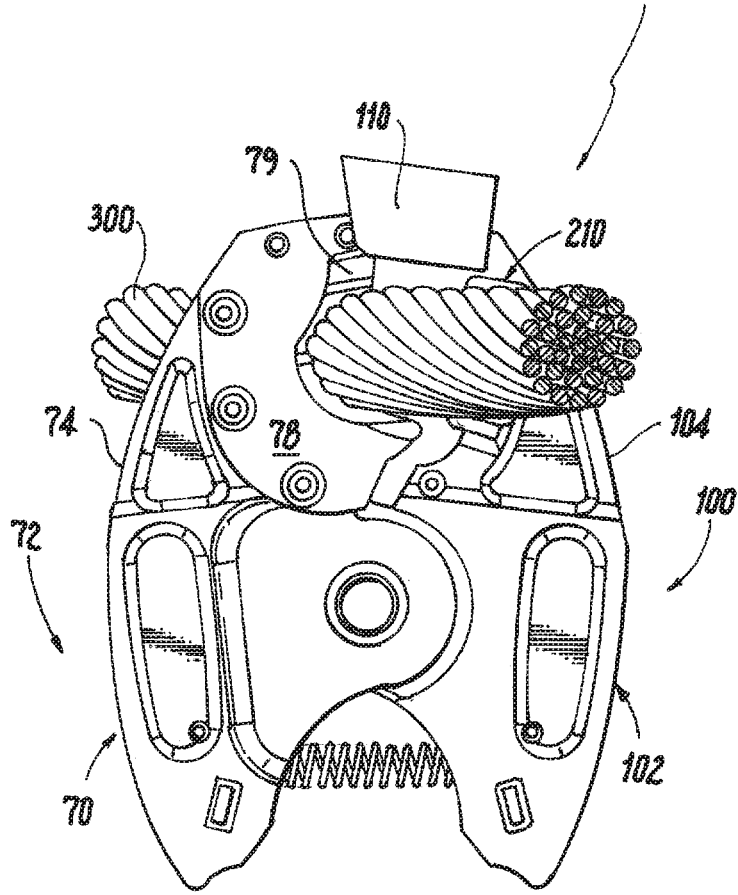
FIG. 42 is a side elevation view of the working head assembly of FIG. 40, illustrating the jaw members of the working head assembly moving toward the cutting position with the cutting blades in contact with the conductor, and illustrating the conductor rotating as the cutting blades cut through the conductor.
Figure 43:
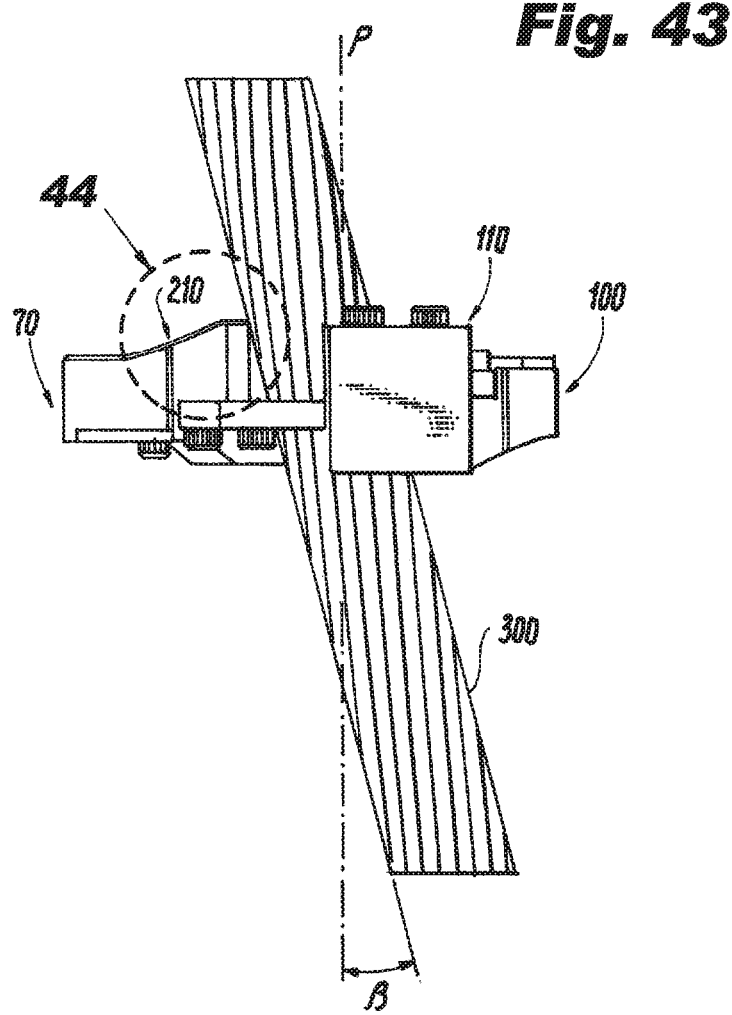
FIG. 43 is a top plan view of the working head assembly of FIG. 42, illustrating a rotation limiting stabilizer limiting the rotation of the conductor as the cutting blades cut through the conductor.
Figure 44:
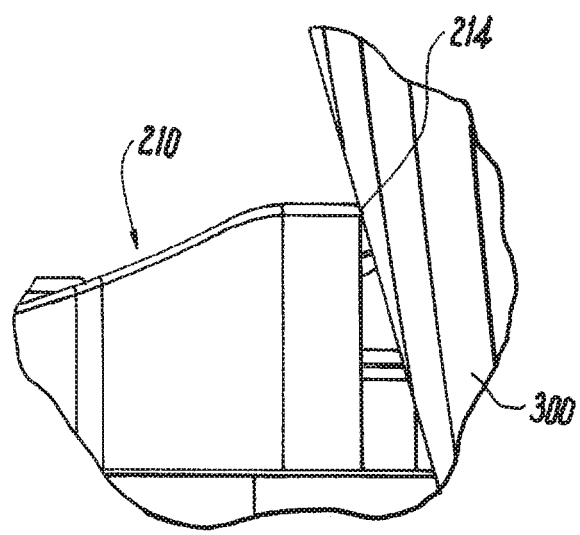
FIG. 44 is an enlarged view of a portion of the tool of FIG. 43 taken from detail 44, illustrating the rotation limiting stabilizer engaging the conductor to limit the rotation of the conductor as the cutting blades cut through the conductor.

The operation of another exemplary embodiment of the stabilizers 210 will be described with reference to FIGS. 29-44. With the jaw members 70 and 100 in the open position, a conductor 300 is inserted between the jaw members such that the conductor generally aligns with an axis "P," as seen in FIGS. 39-41. The axis "P," seen in FIG. 41, is generally perpendicular to the cutting edges 79 and 111 of the cutting blades 78 and 108, respectively. The tool 10 is then activated, via for example operator controls 48 and/or 50, seen in FIG. 1, so that the jaw members 70 and 100 begin a cutting operation where the jaw members move toward the cutting position, as seen in FIGS. 42 and 43. As the cutting blades 78 and 108 cut through the conductor 300, the conductor may begin to rotate so that it is offset from the axis "P," as seen in FIG. 43. Minimal rotation may be acceptable, however, once the rotation of the conductor exceeds a threshold offset angle from axis "P" represented by angle "β," the cutting blades 78 and 108 may begin to separate so as to decrease the efficiency of the cut and/or the life cycle of the cutting edges 79 and 111 of the cutting blades 78 and 108. When the conductor 300 reaches the threshold angle "β" the conductor 300 engages the conductor contacting edge 214, seen in FIG. 44 of each stabilizer 210, which limits or prevents further rotation of the conductor 300. As a non-limiting example, the threshold angle "β" may be in the range of about 15 degrees and about 25 degrees. Limiting or preventing rotation of the conductor 300 permits the cutting blades 78 and 108 to complete the cutting operation without separating and/or without degrading the efficiency of the cut and/or without degrading the life cycle of the cutting edges 79 and 111.

Figure 45:
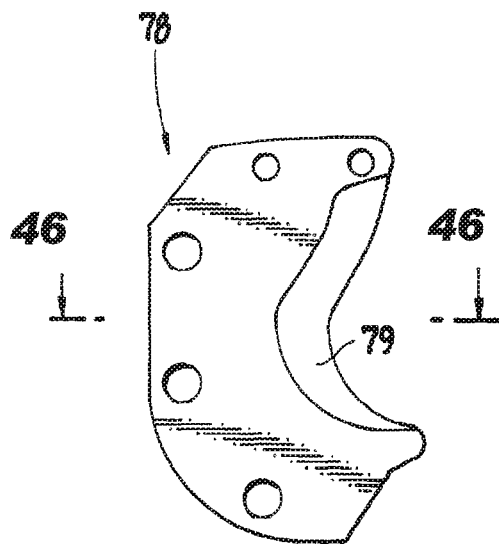
FIG. 45 is a front elevation view of an exemplary embodiment of a cutting blade used with the working head assembly of the present disclosure.
Figure 46:
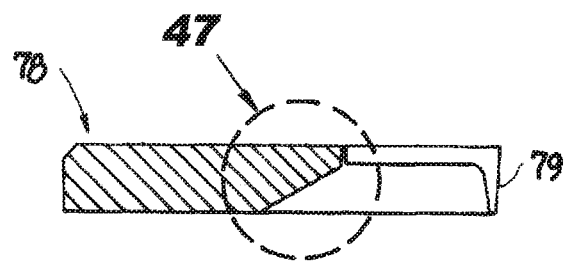
FIG. 46 is a cross-sectional view of the cutting blade of FIG. 45 taken along line 38-38.
Figure 47:
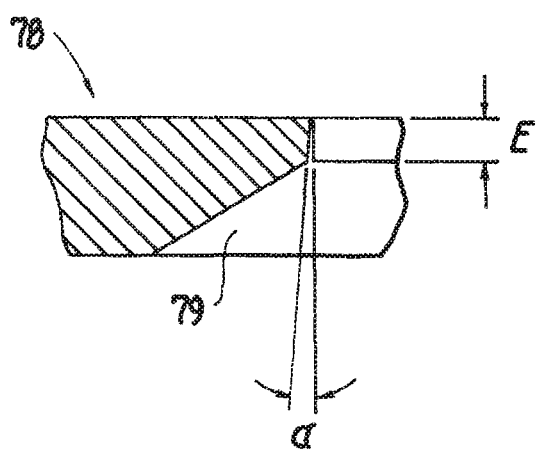
FIG. 47 is an enlarged view of a portion of the cutting blade of FIG. 46 taken from detail 47.

Referring now to FIGS. 45-47, an exemplary embodiment of an improved cutting edge for the cutting blades 78 and 108 is shown. In this exemplary embodiment, the improved cutting edge 79 has a thickness "E" that exceeds the conventional thickness of 0.026 inches which provides a cleaner or more efficient cutting operation and improves the lifecycle of the cutting edge 79. As a non-limiting example, the improved cutting edge 79 has a thickness in the range from about 0.03 inches to about 0.05 inches and preferably about of 0.035 inches. The improved cutting-edge thickness for the cutting blades 78 and 108 increases the lifecycle of the cutting blades. Increasing the cutting-edge thickness can be achieved in combination with the stabilizer 210 which, as noted above, which limits the rotation of the conductor or cable 300 during a cutting operation. As noted above, without using the stabilizers 210 the cable or conductor 300 may rotate during a cutting operation, which effectively increases the cutting diameter of the conductor 300. By using the stabilizers 210 to limit the rotation of the cable or conductor 300 during a cutting operation, the cable or conductor diameter effectively remains about the same as the original diameter of the cable or conductor thus permitting the use of the increase cutting edge thickness and improving the lifecycle of the cutting blades. In addition, the improved cutting edge 79 has a positive edge angle "α" instead of the conventional negative edge angle. A positive edge angle also helps to prevent the cutting blades 78 and 108 from separating during a cutting operation to maintain an efficient cutting operation.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art and are intended to fall within the scope of the invention.

What is claimed is:

1. A working head assembly for an in-line hydraulic cutting tool, the working head assembly comprising:
    a first jaw member having a proximal end portion and a distal end portion, the distal end portion includes a first cutting blade having a first cutting edge, and the proximal end portion is adapted to be operatively coupled to a neck of the cutting tool, the proximal end portion includes a first pivot point member having a first aperture therethrough;

a second jaw member having a proximal end portion and a distal end portion, the distal end portion includes a second cutting blade having a second cutting edge, and the proximal end portion is adapted to be operatively coupled to the neck of the cutting tool, the proximal end portion includes a second pivot point member having a second aperture therethrough;

at least one stabilizer coupled to or formed into the distal end portion of the first jaw member or the second jaw member such that the at least one stabilizer is spaced away from the first or second cutting edge and fixed in position relative to the respective first jaw member or second jaw member, the at least one stabilizer laterally extending from the distal end portion of respective one of the first or second jaw member and is positioned in alignment with respective one of the first or second cutting blade such that during a cutting operation of the cutting tool the at least one stabilizer engages an object being cut by the first and second cutting blades to limit rotation of the object relative to the first and second cutting blades;

a spring member having a first end attached to the proximal end portion of the first jaw member and a second end attached to the proximal end portion of the second jaw member; and a locking pin that can extend through the first and second apertures when the first and second apertures are aligned to operatively couple the first jaw member to the second jaw member and form a pivot point about which the first and second jaw members can rotate.

2. The working head assembly according to claim 1, wherein the at least one stabilizer includes a conductor contacting surface configured to engage the object after rotation of the object relative to the first and second cutting blades exceeds a threshold angle.

3. The working head assembly according to claim 2, wherein the threshold angle is in the range of about 15 degrees and about 25 degrees.

4. The working head assembly according to claim 1, wherein the at least one stabilizer is coupled to the first jaw member or the second jaw member by releasably securing the at least one stabilizer to the first jaw member or the second jaw member.

5. The working head assembly according to claim 1, wherein the first pivot point member comprises a tang having the first aperture, and the second pivot point member comprises clevis having the second aperture, and wherein the clevis receives the tang so that the first aperture can align with the second aperture.

6. The working head assembly according to claim 1, wherein the locking pin includes a pair of circumferential detents spaced apart from one another along a length of the locking pin, wherein the first or second jaw member includes a bore housing a spring and ball assembly, and wherein the spring and ball assembly is configured to engage one of the pair of detents to lock the locking pin in an inserted position or to engage another one of the pair of detents to lock the locking pin in an extended position.

7. The working head assembly according to claim 1, wherein the proximal end portions of the first and second j aw members include a raised tab configured to mate with a respective tab notch in the neck of the cutting tool.

8. A working head assembly for an in-line hydraulic cutting tool, the working head assembly comprising:

a first jaw member having a proximal end portion and a distal end portion, the distal end portion includes a first cutting blade having a first cutting edge, and the proximal end portion is adapted to be operatively coupled to a neck portion of the cutting tool, the proximal end portion includes a tang and a bore through the tang;

a second jaw member having a proximal end portion and a distal end portion, the distal end portion includes a second cutting blade having a second cutting edge, and the proximal end portion is adapted to be operatively coupled to the neck portion of the cutting tool, the proximal end portion includes a clevis having a pair of spaced apart and identical pivot members each with a bore therethrough that receives the tang of the first jaw member such that the bores in the clevis align with the bore in the tang;

at least one stabilizer coupled to or formed into the distal end portion of the first jaw member or the second jaw member such that the at least one stabilizer is spaced away from the first or second cutting edge and fixed in position relative to the respective first jaw member or second jaw member, the at least one stabilizer laterally extending from the distal end portion of respective one of the first or second jaw member and is positioned in alignment with respective one of the first or second cutting blade such that during a cutting operation of the cutting tool the at least one stabilizer engages an object being cut by the first and second cutting blades to limit rotation of the object relative to the first and second cutting blades;

a spring member having a first end attached to the proximal end portion of the first jaw member and a second end attached to the proximal end portion of the second jaw member; and a locking pin that can extend through the bores in the clevis and the bore in the tang when the bores of the clevis and tang are aligned to operatively couple the first jaw member to the second jaw member.

9. The working head assembly according to claim 8, wherein the at least one stabilizer is coupled to the first jaw member or the second jaw member by releasably securing the at least one stabilizer to the first jaw member or the second jaw member.

10. The working head assembly according to claim 8, wherein the at least one stabilizer includes a conductor contacting surface configured to engage the object after rotation of the object relative to the first and second cutting blades exceeds a threshold angle.

11. The working head assembly according to claim 10, wherein the threshold angle is in the range of about 15 degrees and about 25 degrees.

12. A working head assembly for an in-line hydraulic cutting tool, the working head assembly comprising:

a first jaw member having a proximal end portion and a distal end portion, the distal end portion includes a first cutting blade having a first cutting edge, and the proximal end portion is adapted to be operatively coupled to a neck of the cutting tool, the proximal end portion includes a first pivot point member having a first aperture therethrough;

a second jaw member having a proximal end portion and a distal end portion, the distal end portion includes a second cutting blade having a second cutting edge, and the proximal end portion is adapted to be operatively coupled to the neck of the cutting tool, the proximal end portion includes a second pivot point member having a second aperture therethrough;

a first stabilizer coupled to the first jaw member such that the first stabilizer is spaced away from the first cutting edge and fixed in position relative to the first jaw member, the first stabilizer laterally extending in a first direction from the first jaw member, the first stabilizer being aligned with the second cutting blade such that during a cutting operation of the cutting tool the first stabilizer engages an object being cut by the first and second cutting blades to limit rotation of the object relative to the first and second cutting blades;

a second stabilizer coupled to the second jaw member such that the second stabilizer is spaced away from the second cutting edge and fixed in position relative to the second jaw member, the second stabilizer laterally extending in a second direction from the second jaw member, the second direction of the second stabilizer being direct opposite of the first direction of the first stabilizer, the second stabilizer being aligned with the first cutting blade such that during a cutting operation of the cutting tool the second stabilizer engages the object being cut by the first and second cutting blades to limit rotation of the object relative to the first and second cutting blades;

a spring member having a first end attached to the proximal end portion of the first jaw member and a second end attached to the proximal end portion of the second jaw member; and a locking pin that can extend through the first and second apertures when the first and second apertures are aligned to operatively couple the first jaw member to the second jaw member and form a pivot point about which the first and second jaw members can rotate.

13. The working head assembly according to claim 12, wherein the first stabilizer is coupled to the first jaw member by releasably securing the first stabilizer to the first jaw member, and wherein the second stabilizer is coupled to the second jaw member by releasably securing the second stabilizer to the second jaw member.

14. The working head assembly according to claim 12, wherein the first stabilizer is coupled to the first jaw member by forming the first stabilizer with the first jaw member as a single piece, and wherein the second stabilizer is coupled to the second jaw member by forming the second stabilizer with the second jaw member as a single piece.

15. The working head assembly according to claim 12, wherein the first stabilizer includes a first conductor contacting surface configured to engage the object after rotation of the object relative to the first and second cutting blades exceeds a threshold angle, and wherein the second stabilizer includes a second conductor contacting, surface configured to engage the object after rotation of the object relative to the first and second cutting blades exceeds the threshold angle.

16. The working head assembly according to claim 15, wherein the threshold angle is in the range of about 15 degrees and about 25 degrees.

17. The working head assembly according to claim 12, wherein the first pivot point member comprises a tang having the first aperture, and the second pivot point member comprises clevis having the second aperture, and wherein the clevis receives the tang so that the first aperture can align with the second aperture.

* * * * *